(12) United States Patent
Barnes

(10) Patent No.: US 7,883,622 B1
(45) Date of Patent: Feb. 8, 2011

(54) WATER TREATMENT METHODS AND SYSTEMS USING COMBINATIONS OF OZONE AND CHLORINE GENERATORS

(76) Inventor: Ronald L. Barnes, 2823 Castle Pines Cir., Owens Crossroads, AL (US) 35763

( * ) Notice: Subject to any disclaimer, the term of this patent is extended or adjusted under 35 U.S.C. 154(b) by 0 days.

(21) Appl. No.: 11/906,403

(22) Filed: Oct. 2, 2007

Related U.S. Application Data

(63) Continuation-in-part of application No. 11/137,890, filed on May 26, 2005, now Pat. No. 7,329,343, which is a continuation-in-part of application No. 10/701,310, filed on Nov. 4, 2003, now Pat. No. 7,186,334, which is a continuation-in-part of application No. 10/668,504, filed on Sep. 23, 2003, now Pat. No. 7,135,108.

(51) Int. Cl.
*E04H 4/12* (2006.01)
*C02F 1/76* (2006.01)
*C02F 1/78* (2006.01)

(52) U.S. Cl. ............... 210/143; 210/167.11; 210/198.1; 210/206; 210/416.2

(58) Field of Classification Search ................. 210/143, 210/167.1, 167.11, 167.12, 198.1, 206, 416.1, 210/416.2, 748; 204/194, 660, 665; 4/507
See application file for complete search history.

(56) References Cited

U.S. PATENT DOCUMENTS

| | | | | |
|---|---|---|---|---|
| 3,326,747 A | * | 6/1967 | Ryan et al. | ............ 424/667 |
| 3,361,663 A | * | 1/1968 | Murray et al. | ............ 204/278 |
| 3,474,817 A | * | 10/1969 | Bates et al. | ............ 137/268 |
| 4,059,522 A | * | 11/1977 | Polley et al. | ............ 210/198.1 |
| 4,201,651 A | | 5/1980 | Themy | |
| 4,283,263 A | | 8/1981 | Mirabelli | |
| 4,361,471 A | | 11/1982 | Kosarek | |
| 4,596,648 A | | 6/1986 | Sweeney | |
| 4,613,415 A | | 9/1986 | Wreath et al. | |
| 4,724,059 A | * | 2/1988 | Collier | ............ 204/228.2 |
| 4,761,208 A | | 8/1988 | Gram et al. | |
| 4,781,810 A | * | 11/1988 | Tucker | ............ 204/228.2 |
| 4,804,449 A | | 2/1989 | Sweeney | |
| 4,820,408 A | * | 4/1989 | Sandig | ............ 210/98 |

(Continued)

FOREIGN PATENT DOCUMENTS

JP 62-176594 * 8/1987

(Continued)

*Primary Examiner*—Fred Prince
(74) *Attorney, Agent, or Firm*—Mark Clodfelter

(57) ABSTRACT

Methods and apparatus for efficient implementation and control of water treatment bypass loops combining ozone and chlorine injection are disclosed. Combined use of ozone and chlorine exploits high oxidation potential of ozone while retaining longer lived residual effectiveness of chlorine for high efficacy against contaminants, particularly biological and organic. Embodiments including automated monitoring and control of chlorine concentrations in presence of high oxidation potentials from ozone are disclosed, as is an inexpensive circuit for using a signal from a redox sensor for controlling output from an electrolysis cell. Also disclosed is a multipurpose enclosure that may be used, with different inserts, to implement an electrolysis cell, an ultraviolet ozone generator, an advanced oxidation unit, or an erosion feeder for adding dissolved salt to water for use in an electrolysis cell. The multipurpose enclosure helps reduce cost associated with maintaining inventories of different components used in water purification systems.

17 Claims, 15 Drawing Sheets

U.S. PATENT DOCUMENTS

| | | |
|---|---|---|
| 5,008,087 A | 4/1991 | Batchelor |
| 5,037,519 A * | 8/1991 | Wiscombe .................. 204/237 |
| 5,061,343 A | 10/1991 | Azarniouch et al. |
| 5,094,734 A | 3/1992 | Torrado |
| 5,314,589 A * | 5/1994 | Hawley ...................... 205/618 |
| 5,334,383 A | 8/1994 | Morrow |
| 5,395,537 A | 3/1995 | Ellison |
| 5,451,318 A | 9/1995 | Moorehead |
| 6,007,726 A * | 12/1999 | Yang et al. .................. 210/752 |
| 6,132,629 A | 10/2000 | Boley |
| 6,340,736 B1 | 1/2002 | Coenen et al. |
| 6,368,472 B1 | 4/2002 | McGuire |
| 6,491,811 B2 | 12/2002 | Conrad et al. |
| 6,517,713 B2 | 2/2003 | Gargas |
| 6,551,518 B2 | 4/2003 | Gargas |
| 6,692,645 B1 | 2/2004 | Gargas |
| 6,814,877 B2 | 11/2004 | Gargas |
| 6,984,295 B2 | 1/2006 | Shiue et al. |
| 7,329,343 B1 * | 2/2008 | Barnes .................... 210/167.1 |
| 2007/0207053 A1 * | 9/2007 | Doyle et al. .................. 422/14 |

FOREIGN PATENT DOCUMENTS

| | | | |
|---|---|---|---|
| JP | 3-181390 | * | 8/1991 |
| JP | 4-156994 | * | 5/1992 |

* cited by examiner

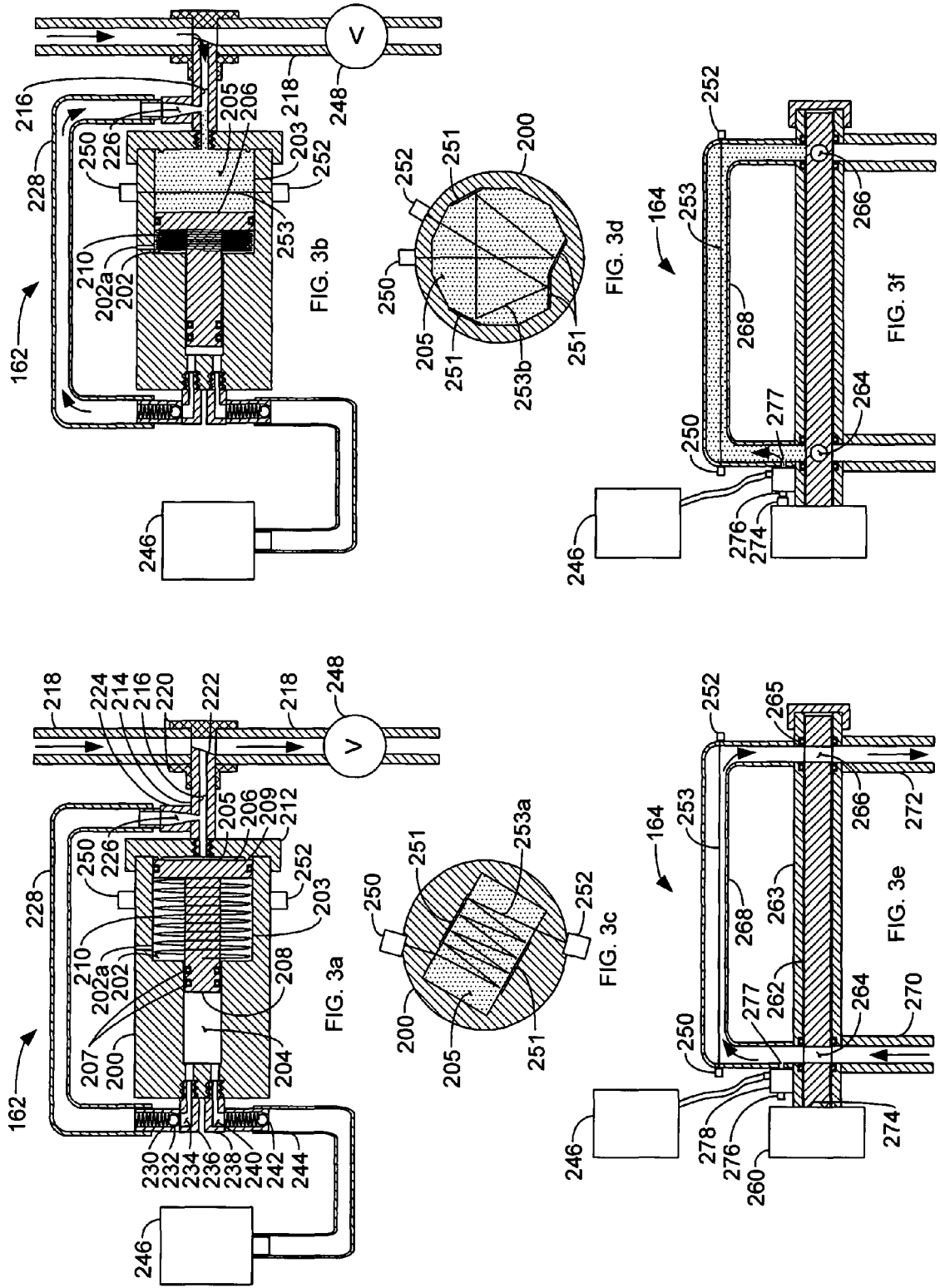

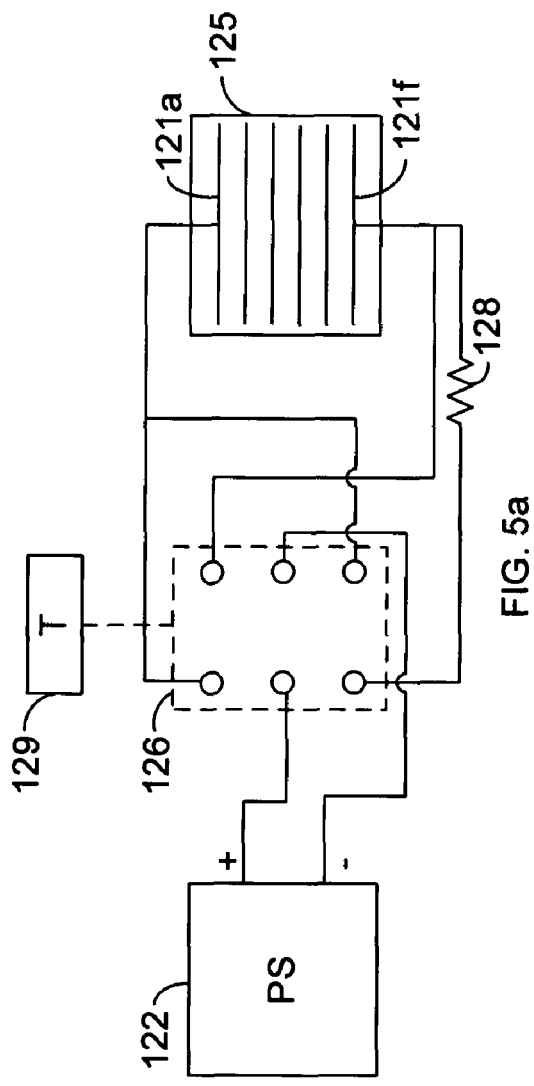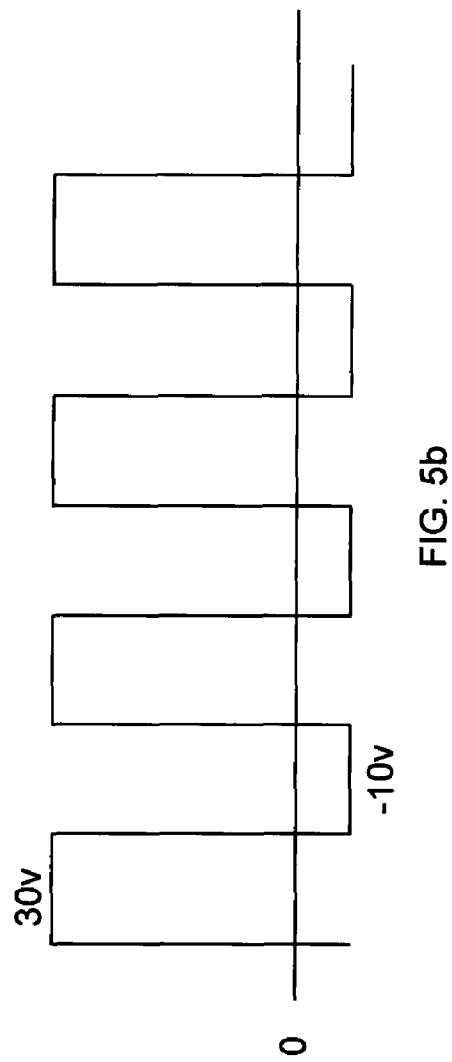
FIG. 5a
FIG. 5b

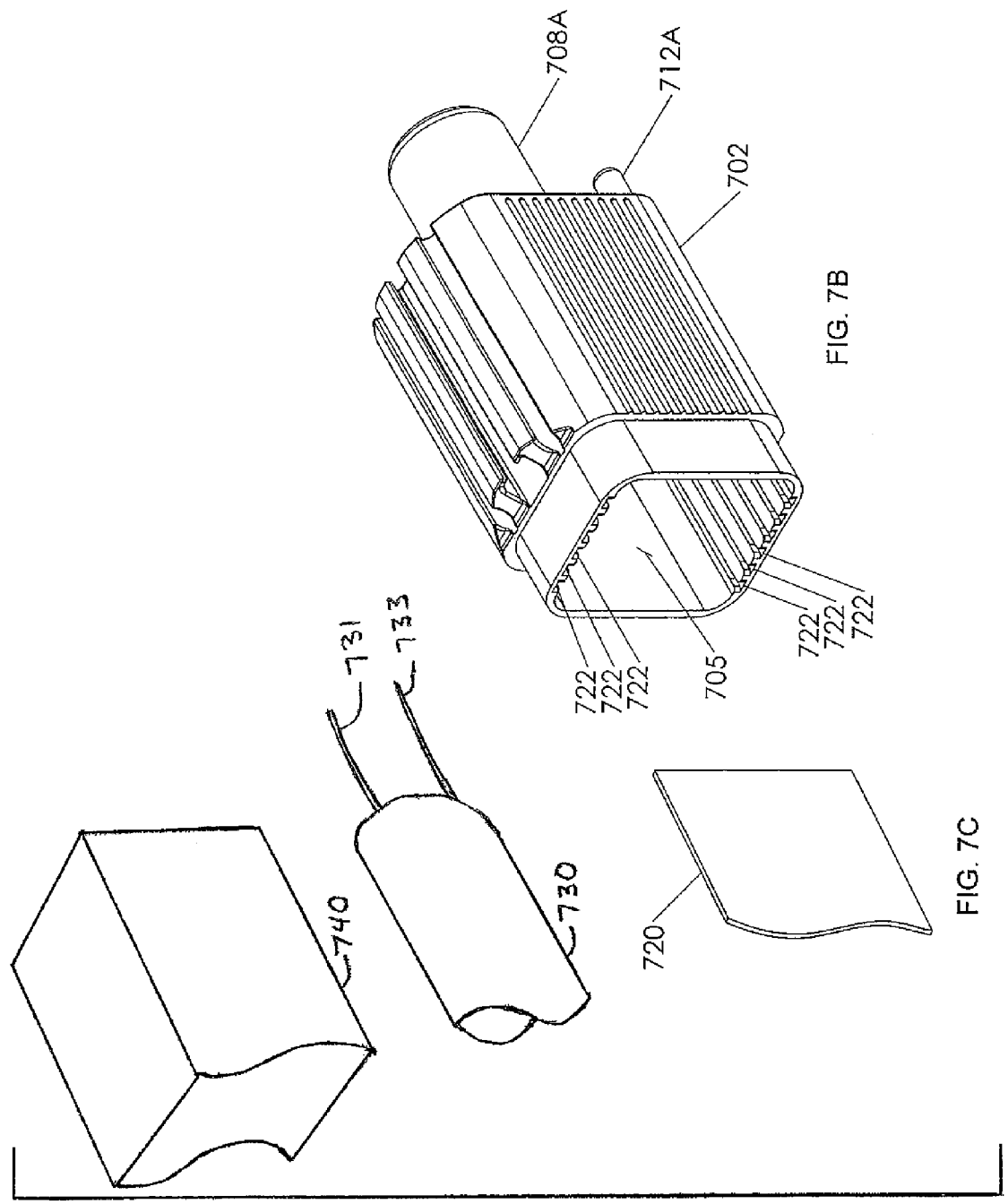

WATER TREATMENT METHODS AND SYSTEMS USING COMBINATIONS OF OZONE AND CHLORINE GENERATORS

CROSS-REFERENCE TO RELATED APPLICATIONS

The instant application is a continuation-in-part of Applicant's copending patent application Ser. No. 11/137,890, filed May 26, 2005, now U.S. Pat. No. 7,329,343, which is a continuation-in-part of Applicant's patent application Ser. No. 10/701,310, filed Nov. 4, 2003, now U.S. Pat. No. 7,186,334, issued Mar. 6, 2007, which is a continuation-in-part of Applicant's patent application Ser. No. 10/668,504, filed Sep. 23, 2003, now U.S. Pat. No. 7,135,108, issued Nov. 14, 2006.

Applicant's prior U.S. patent application Ser. Nos. 11/137,890, filed May 26, 2005, now U.S. Pat. Nos. 7,329,343 and 10/701,310, filed Nov. 4, 2003, now U.S. Pat. No. 7,186,334 are hereby incorporated herein by reference in their entireties.

In addition to the foregoing priority chain, Applicant also has the following copending applications:

Ser. No. 10/325,761 filed Dec. 20, 2002 Combined Ozone Infusion and Aroma Therapy; now abandoned, Ser. No. 11/165,953 filed Jun. 24, 2005 Multistage Multiloop Water Purification System; now abandoned, Ser. No. 11/190,186, filed Jul. 26, 2005 Hybrid Ultraviolet and Corona Discharge Ozone Generator System; pending, Ser. No. 11/284,290 filed Nov. 21, 2005 Ozone Generation and Water Purification Unit for Home, Camping or Emergency Use; now abandoned, Ser. No. 11/305,975 filed Dec. 19, 2005 Oxygen Concentration, Ozone Generation, and Water Purification Unit for Residential or Emergency Use; pending, Ser. No. 11/406,639 filed Apr. 19, 2006 Ozone Generator Retrofit Apparatus for Jetted Tubs, Spas, and other Water Circulation Facilities; pending, Ser. No. 11/714,411 filed Mar. 6, 2007 Combined Chloride and Ozone Generator Sterilization System; now U.S. Pat. No. 7,604,735, Ser. No. 11/980,001 filed Oct. 30, 2007 Assembly for Purifying Water; now abandoned, Ser. No. 11/980,002 filed Oct. 30, 2007 Water Treatment Bypass Loops Having Ozone and Chloride Generators; now abandoned, Ser. No. 11/980,854 filed Oct. 31, 2007 Venturi Injector with Self-Adjusting Injection Port; pending, Ser. No. 11/980,950 filed Oct. 31, 2007 Combined Chlorine and Ozone Sterilization System; pending, Ser. No. 11/980,951 filed Oct. 31, 2007 Assembly for Purifying Water; pending, Ser. No. 11/981,416 filed Oct. 31, 2007 Adjustable Venturi; pending, and Ser. No. 12/030,067 filed Feb. 12, 2008 Water Treatment Bypass Loops Having Ozone and Chlorine Generators, now abandoned.

FIELD OF THE INVENTION

This application relates generally to methods and apparatus for using combinations of ozone and chlorine generators for various benefits in water treatment systems, particularly systems employing bypass loops.

BACKGROUND OF THE INVENTION

It has become a relatively common practice to generate chlorine, for use in swimming pools, spas, and other water treatment applications, by electrolysis of a solution containing a chlorine salt. In conventional practice, common salt (i.e., sodium chloride—NaCl) is dissolved in pool or spa water. Less commonly, other chlorine salts, such as potassium chloride (KCl) may also be used. An electrolysis cell, sometimes called a salt chlorine generator, or simply "salt generator," is installed in series with a pump and filter in a main line water circulation loop and used to electrolyze pool water to generate free chlorine from the brine solution. The chlorine then reacts with and oxidizes biological and other contaminants in pool water. However, introduction of salt into pool or spa water can lead to more rapid corrosion of hardware and equipment installed in a vicinity of a pool or spa. In addition, byproducts of electrolysis reactions using NaCl include formation of sodium hydroxide and other undesirable chemicals. Since, in conventional practice, virtually all byproducts of an electrolysis reaction remain in circulating pool or spa water, it is necessary to neutralize or remove such byproducts to avoid exposing swimmers or bathers to irritating or unsafe levels of caustic sodium hydroxide or other undesirable chemicals.

In some pool, spa, hot tub, or similar water treatment applications, ozone from an ozone generator may be used to provide an oxidation potential for oxidation reactions with various contaminants. Ozone can provide a higher oxidation potential than chlorine and may thus be more effective against some biological, chemical, or other contaminants than chlorine alone. However, due to the higher reactivity and instability of ozone, ozone will generally provide less residual reactivity for reacting with contaminants that may be introduced into water after initial neutralization of contaminants by an initial higher level of ozone. Thus, for some applications, it may be desirable to make use of both ozone and chlorine, or another halogen, in order to obtain the separate benefits of each in treating water. Other halogens, e.g., bromine, may also be generated from their salts, e.g., NaBr, KBr, in a manner similar to that described above for chlorine. Moreover, there are also some beneficial synergistic effects, as well as other non-obvious effects, when ozone and chlorine or another halogen are used together in a water treatment system. Some of these effects may be exploited to reduce maintenance and operating costs for pools, spas, and other facilities with such water purification systems, and other effects must be addressed to prevent undesirable responses from redox control systems, as described later herein, when both ozone and chlorine are used in a given water treatment application.

It is thus one object of the instant invention to provide novel and unobvious methods and apparatus for combining use of chlorine and ozone in a water treatment system in ways that exploit separate and combined properties of ozone and chlorine or other halogens, and associated reaction byproducts, to obtain synergistic benefits relative to treatment and purification of water or other fluids. It is another object of the invention to provide control methods and control systems that maintain desirable levels of chlorine or other treatment chemicals in a presence of influences and effects of ozone on conventional control systems, especially those employing redox sensors. It is another object of the invention to provide methods and apparatus for configuring and operating separate and combined components of a water treatment system using one or more halogens and ozone such that reliability is enhanced and maintenance (e.g., removing deposits from, or replacing, electrolysis plates) is reduced.

Other objects of the invention will become clear upon a reading of the following specification.

BRIEF DESCRIPTION OF THE DRAWINGS

FIGS. 3a, 3b, 3c, and 3d are cross-sectional views of a chemical indicator injection and chemical concentration measuring device.

FIGS. 3e and 3f are cross-sectional views of a different embodiment of a chemical indicator injection and chemical concentration measuring device.

FIG. 5a is a schematic illustration showing how electrical potentials applied to electrode plates in an electrolysis cell may be periodically reversed.

FIG. 5b is an illustration of a time-varying voltage waveform that may be applied to electrode plates in FIG. 5a.

FIG. 7aa is an isometric view of the enclosure of FIG. 7a but with sections separated.

FIG. 7b is an isometric view of a section of a multipurpose enclosure as shown in FIG. 7a.

FIG. 7c illustrates different internal components that may be used with the multipurpose enclosure shown in FIG. 7a.

FIG. 7d is an external view of an end of the enclosure of FIG. 7a.

FIG. 7e is a view of the interior of an end of the enclosure of FIG. 7a.

FIG. 7f is an oblique view of the interior of an end of a section of the enclosure of FIG. 7a.

DETAILED DESCRIPTION OF THE DRAWINGS

Applicant's prior U.S. patent application Ser. No. 11/137,890, previously incorporated herein by reference, described a typical water circulation or water treatment main loop such as may be used for filtering, and in some cases heating, water in a conventional swimming pool, spa, whirlpool bath, or other bathing facility. As noted, in some installations, conventional salt (i.e., NaCl), or another halogen salt, may be added to the water in a facility and an electrolysis cell, also referred to as a salt chlorine generator, or simply salt generator, may be included directly in the main loop to generate chlorine or another halogen from the saline water flowing in the main loop. Chlorine freed by electrolysis provides an oxidation potential sufficient to react with and help neutralize many biological and other contaminants in the water in a facility. Applicant's prior U.S. patents and patent applications have described how a bypass loop may be installed around one or more components in the water circulating system, such as a filter and possibly a water heater, a pump, or another portion of a water circulation main loop, and wherein sufficient pressure difference exists to promote flow through a bypass loop of a portion of the water flowing in the main loop. The bypass loop may then be used, with various advantages, for injection of ozone and other treatment chemicals, including chlorine and/or other halogens from an electrolysis cell. Advantages include ease of installation of a bypass loop, especially using an adaptable saddle clamp such as described in Applicant's application Ser. No. 11/137,890, use of smaller hardware to accommodate the reduced flow through a bypass loop, and achievement of higher concentrations of treatment chemicals in water flowing within the bypass loop. Higher concentrations within the bypass loop will generally provide higher lethality for many micro-organisms and reduce the likelihood of surviving micro-organisms which could otherwise be progenitors of subsequent generations of micro-organisms having a greater tolerance, or resistance build-up, to such treatment chemicals.

Figure 1:
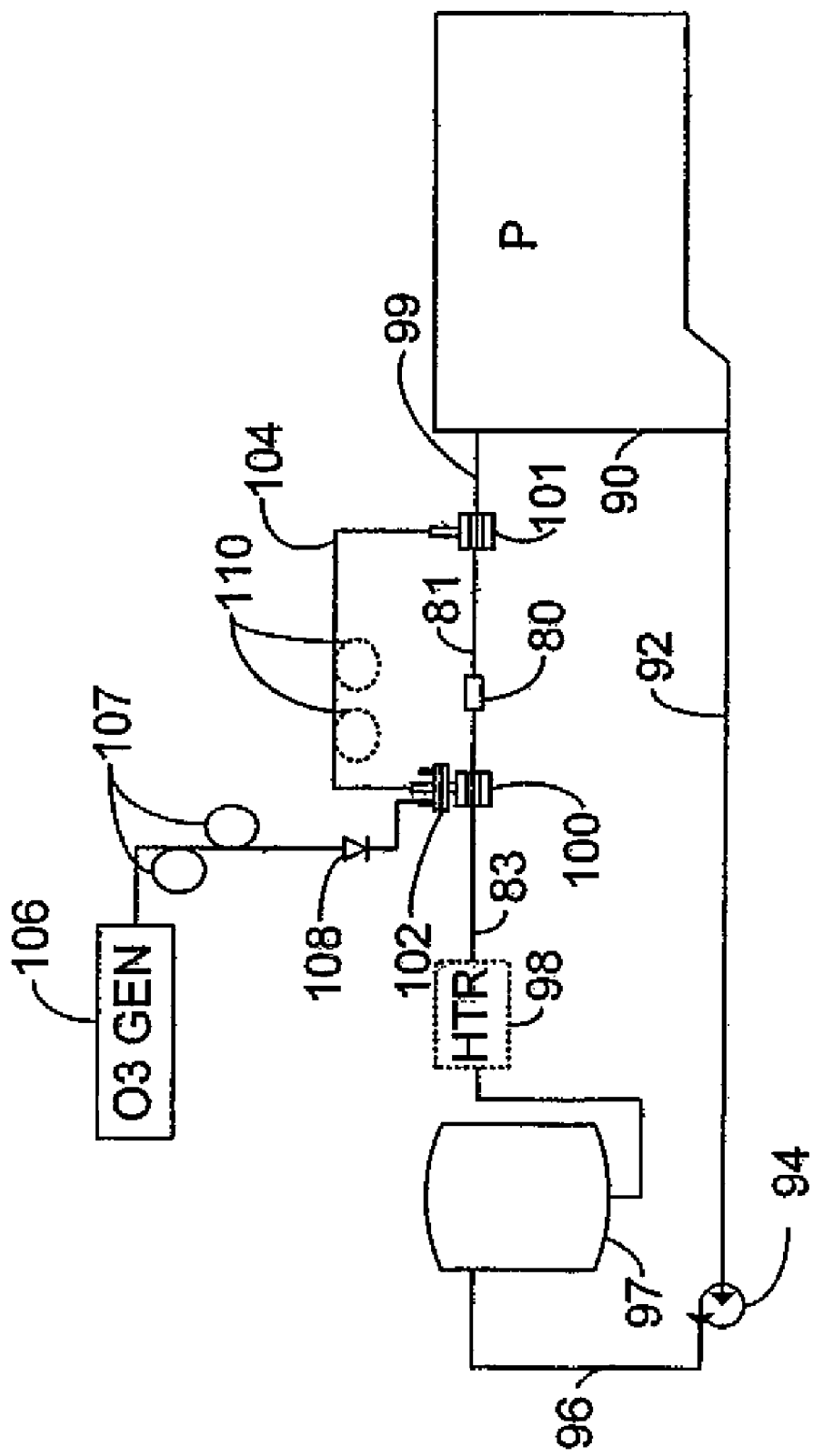
FIG. 1 is a schematic illustration of a main water circulation loop having a bypass loop and an ozone injector.

FIG. 1 schematically illustrates a bypass loop 104 installed around a restriction 80 in a water circulation main loop 92, 96, 83, 81, 99 that creates a sufficient pressure drop or pressure difference between bypass loop intake fitting 100 and bypass loop outlet fitting 101 to promote a flow of water through bypass loop 104 when water is being pumped through main loop 92, 96, 83, 81, 99 by main loop pump 94. Such a restriction 80 may be needed in some spas or other systems where the filter is incorporated with or too near a skimmer to use the filter as a restriction. In other instances, the filter may be used as the restriction 80. As such, and for purposes of this application, it is to be understood that restriction 80 may be interchangeable with a filter, and possibly include a heater and other components. Bypass loop intake and outlet fittings 100, 101, respectively, may be embodiments of Applicant's adaptable saddle clamp disclosed in application Ser. No. 11/137, 890 or may be conventional fittings, such as pipe "T" fittings and/or compression fittings. Restriction 80 may comprise a spring loaded check valve, a simple reduction in diameter in a length of tubing in the main loop using custom or conventional pipe fittings, or a valve or pressure regulator that may be manually or automatically adjustable to change the relative volumes of water flowing through main loop segment 81 and bypass loop 104. As disclosed in application Ser. No. 11/137, 890, other "forward" or "reverse" bypass loop installations may take advantage of other pressure changes (e.g., across a filter, heater, or pump) within a main water circulation loop in order to provide for flow within a bypass loop. Other bypass loop installations may use an additional pump to provide flow through the bypass loop. In FIG. 1, a Venturi injector 102 or other conventional injector used to draw or infuse a gas mixture including ozone from ozone generator 106 into water flowing through loop 104 may be included in bypass loop 104. A check valve 108 and/or anti-backflow loops 107 may be included in tubing from ozone generator 106 to injector 102 to prevent backflow of water into ozone generator 106. Ozone generator 106 may generate ozone by use of ultraviolet light, and may include a compressor for using atmospheric oxygen, bottled oxygen or an oxygen concentrator. Ozone generator 106 may generate ozone via a corona discharge, wherein flow of air or oxygen through a corona discharge device may be promoted by a reduced pressure at an injection port of Venturi injector 102 or by a optional pump added between ozone generator 106 and injector 102. Such a corona discharge ozone generator may also use bottled oxygen or oxygen from an oxygen concentrator. Optional contact enhancing loops 110 may be included in bypass loop 104 to help insure sufficient contact distance for thorough mixing and/or absorption of ozone or other treatment chemicals in water flowing through bypass loop 104 before water is returned to main loop portion 99 and pool or other vessel 90. Having sufficient contact distance helps promote more complete absorption of ozone in bypass water before water is returned to main loop portion 99, thereby (1) leading to higher concentrations of treatment chemicals and higher efficacy in reducing contaminants in water flowing in bypass loop 104, (2) reducing inefficiencies resulting from loss of ozone in gas bubbles from pool 90, and (3) also reducing likelihood of a buildup of unabsorbed ozone gas to unacceptable concentration levels in breathing air in an enclosure for a spa or whirlpool bath.

Figure 2A:
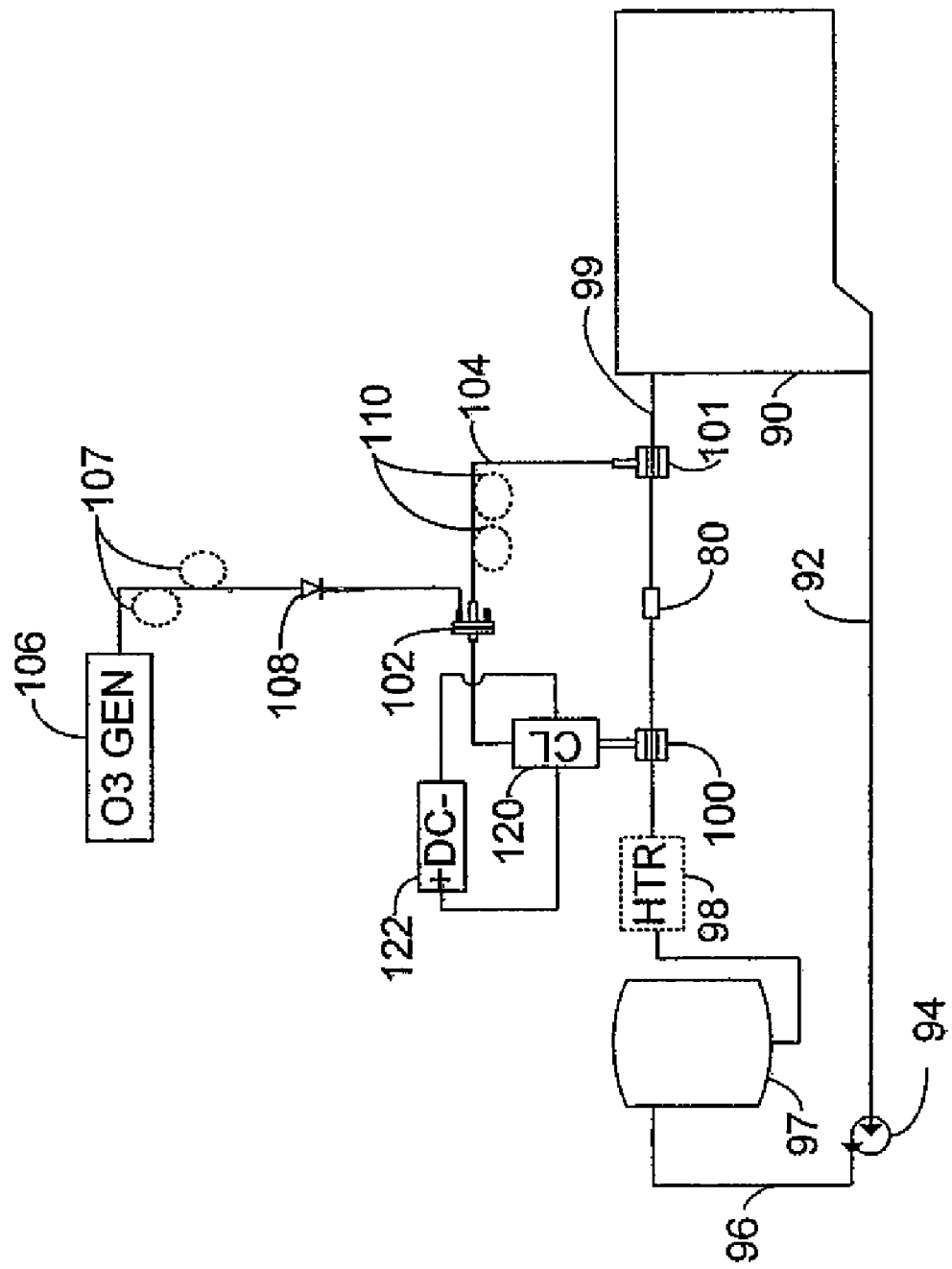
FIG. 2a is a schematic illustration of a main water circulation loop having a bypass loop including a chlorine generator and an ozone injector.

FIG. 2a illustrates a configuration similar to that shown in FIG. 1, but an electrolysis cell 120 has been included in bypass loop 104, notably prior to injector 102 for ozone or other treatment chemicals. Although Applicant's prior application Ser. No. 11/137,890 disclosed potential benefits of using bubbles containing ozone in helping to reduce buildup of calcium or other contaminants on electrode plates within an electrolysis cell, in some installations and conditions such bubbles may reduce efficiency of an electrolysis cell in generating chlorine, thereby creating a tradeoff between the cleaning benefits of injecting ozone prior to an electrolysis cell, and possible loss of efficiency. A configuration such as shown in FIG. 2a provides injection of bubbles including ozone via injector 102 which is positioned (in terms of bypass flow direction) after electrolysis cell 120. Such a configuration may be advantageous, particularly in installations wherein buildup of calcium deposits or other materials in electrode plates is less of a problem. Installations wherein ozone is injected after an electrolysis cell may also be used to similar advantage in other forward bypass loops around filters or reverse bypass loops around pumps as disclosed in Applicant's application Ser. No. 11/137,890, previously incorporated herein by reference.

Figure 2B:
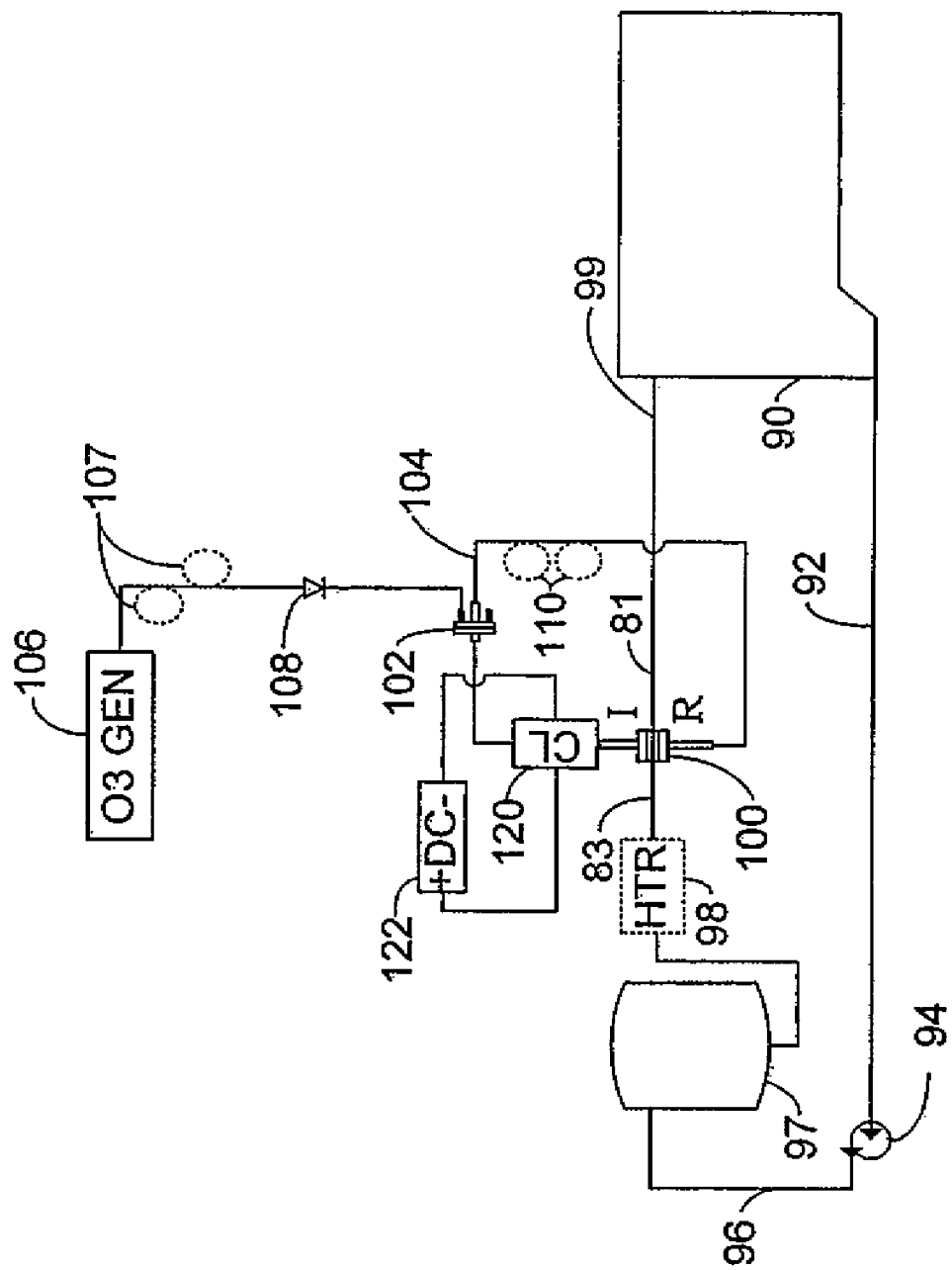
FIG. 2b is a schematic illustration of a main water circulation loop having a bypass loop installed using a single connection fitting.

FIG. 2b illustrates an installation of a bypass loop similar to that shown in FIG. 2a except that in FIG. 2b, both intake I and return R of bypass loop 104 are installed using a single adaptable saddle clamp assembly (such as disclosed in FIG. 2g and FIG. 10 in Applicant's application Ser. No. 11/137,890), wherein a pressure differential needed to promote flow through bypass loop 104 is provided by having a bypass loop 104 intake opening facing into a direction of water flow in pipe section 83 in the main water circulation loop, and a bypass loop 104 outlet opening directed toward a direction of flow of water in pipe section 81, and wherein flow restrictions created by loop 104 intake and outlet fittings also promote flow through bypass loop 104. A similar configuration for bypass loop 104 may also be implemented with conventional plumbing fittings. In such an installation, the motive force that causes a portion of the fluid flowing in pipe 83 to flow through bypass loop 104 is provided by a combination of dynamic pressure of fluid impinging upon an opening in an intake pipe and restriction of flow within pipe 83 at adaptable saddle clamp or conventional fitting 100 created by presence of intake and return tubing sections within pipe 83, causing a pressure difference between an intake opening facing into pipe 83 and a return opening facing into pipe 81.

Figure 2C:
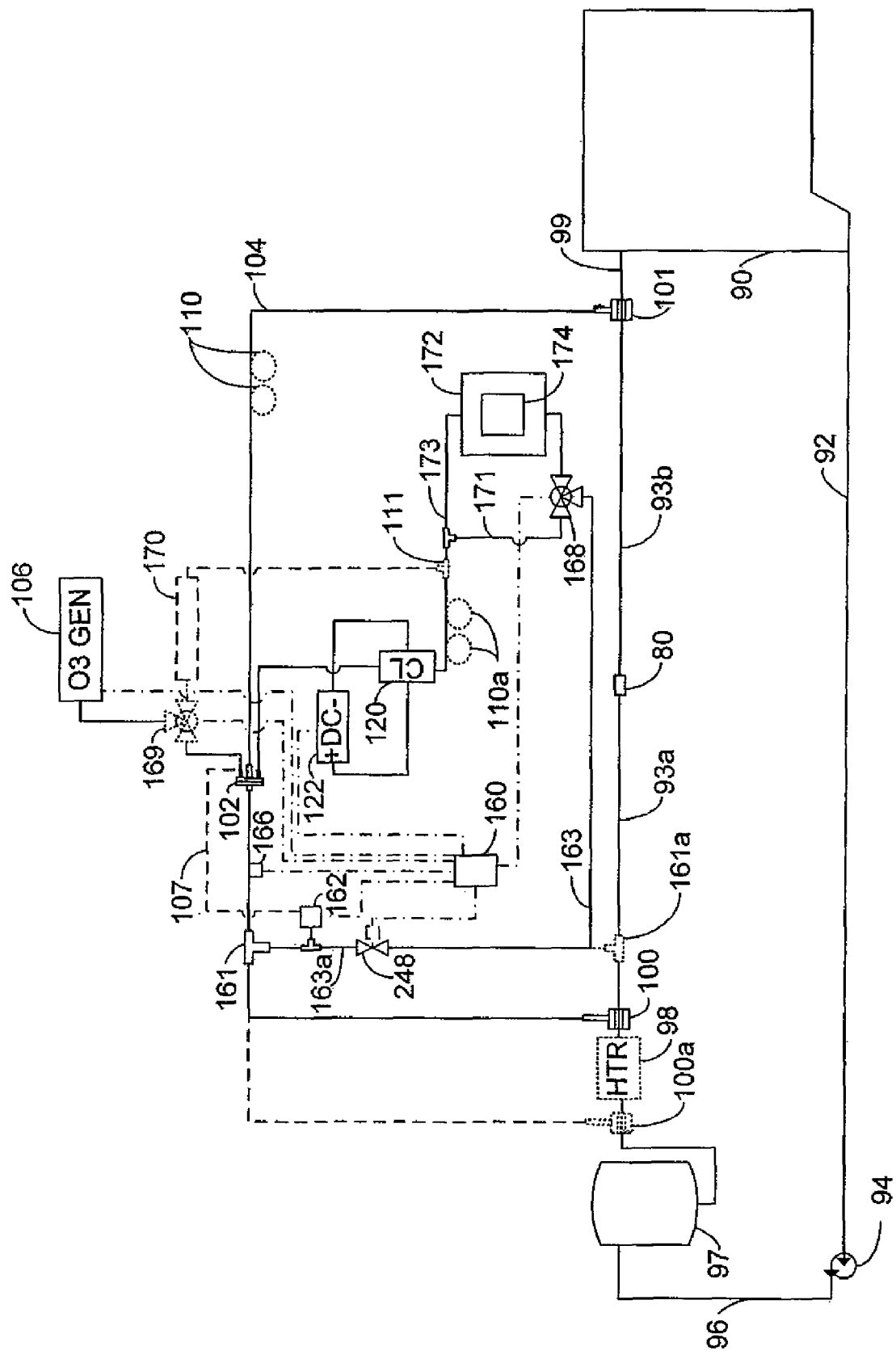
FIG. 2c is a schematic illustration of a main water circulation loop having a bypass loop which includes a secondary bypass loop for generation of a halogen.

FIG. 2c illustrates a primary bypass loop 104 around main loop restriction 80 wherein primary bypass loop 104 includes Venturi injector 102. A secondary bypass loop 163 originates at a "T" or similar fitting 161 in primary bypass loop 104 or optionally in another fitting 161a in a main loop segment prior to restriction 80 (with chlorine sensor 162 and valve 248, described later herein, being appropriately repositioned to be attached to secondary bypass loop 163) and returns to primary bypass loop 104 via a port on Venturi injector 102, with flow in secondary bypass loop 163 being induced by a pressure difference between fitting 161 (or optionally fitting 161a) and the return port on Venturi injector 102. Depending upon position of valve 168, water flowing in secondary bypass loop 163 may be directed through chamber 172 which holds a cake or block 174 or other form of a salt or salt mixture which slowly dissolves into water selectively routed through chamber 172 by valve 168, thereby providing a saline or brine solution through tubing 173 to salt chlorine generator electrolysis cell 120. In one embodiment, valve 168 may be set to provide a very slow rate of flow through chamber 172 and cell 120 so that a saturated solution is always present in chamber 172, preventing the cake or block 174 from quickly dissolving. Such a slow rate of flow will allow efficient electrolysis of the salt, and provides sufficient chlorine for sanitizing purposes. Chamber 172 may be the same or similar to a sanitizer dispenser disclosed in Applicant's U.S. design patent D493,509, which is hereby incorporated herein by reference in its entirety. Salt block 174 may comprise NaCl, KCl, NaBr, KBr, or another salt or mixture of salts, including salts of silver, copper, or zinc which may provide additional benefits in helping to control growth of algae or other micro-biota. Electrolysis cell 120 includes a number (typically 4 to 8) of electrode plates, as described in application Ser. No. 11/137,890, and uses an electrical potential provided by power supply 122 to generate chlorine or another halogen by electrolysis from the salt or salt mixture dissolved in water flowing through electrolysis cell 120. Typically, current between the electrode plates is controlled or held constant so as to provide the desired amount chlorine from electrolysis. Electrolysis cell 120 may include static mixers or other devices, preferably downstream of electrolysis plates, to promote turbulence and thorough mixing of water flowing through cell 120 with chlorine or other halogen or halogen compounds generated within cell 120. Water including the dissolved salt and chlorine or other halogen or halogen compounds generated within electrolysis cell 120 then continues to flow from electrolysis cell 120 to a port on Venturi 102, where the salt and halogen solution is drawn through Venturi 102 into water flowing through bypass loop 104. It is noted that current in electrolysis cell 120 and a flow of brine or salt solution therethrough may be adjusted so that most of the salt is electrolyzed, preventing an excess buildup of salt in the pool or spa.

When mixed with water flowing in bypass loop 104, chlorine or other halogen compounds may provide sufficient oxidation potential to react with and neutralize contaminants in water flowing through bypass loop 104, and may also provide sufficient residual oxidation capability to continue to react with other contaminants in water in a pool, spa, or other vessel 90. In some embodiments, position of valve 168 may be controlled responsive to a sensor used to monitor concentration of salt in water flowing in bypass loop 104 or in water in main loop 92, 96, 93a, 93b, 99, or in vessel 90. Here, salinity may be estimated by monitoring current flow through plates in electrolysis cell 120.

A water treatment system such as illustrated in FIG. 2c, wherein an erosion cell or other chemical feeder cell is used to provide a saline or brine solution of adequate concentration to support efficient electrolysis for generation of chlorine (or another halogen), offers significant advantages over conventional practice of adding sufficient salt directly to a main body of water in a pool or spa to provide a high enough concentration of salt in the main body of water for efficient electrolysis. This conventional practice has been found by some pool or spa owners to lead in some cases to significant corrosion of plumbing, electrical, and other fixtures and fittings associated with such pools or spas. Although in a typical embodiment of the instant invention, a relatively small amount of water that flows through erosion cell chamber 172, and thus includes dissolved salt(s), will eventually be mixed with the main body of water in a pool or spa being treated, a rate of buildup of salt concentration will be slow in comparison to conventional practice of adding sufficient salt to all the water in a pool to obtain an adequate concentration for efficient and effective electrolysis. Thus, the net concentration of salt in the main body of water will be less over a period or season of use of a pool or spa, thereby causing less corrosion and other deleterious effects before a pool is drained at an end of a season or before a whirlpool bath or spa is emptied periodically.

In some embodiments, an ozone generator 106 may provide a gas mixture including ozone through valve 169 to another port of Venturi 102, so that ozone may also be drawn through Venturi 102 and injected into water flowing in bypass loop 104. Ozone, having a higher oxidation potential than chlorine or bromine, will react with a broader range of contaminants than chlorine or bromine, but, due to its higher reactivity and instability, ozone concentration typically drops more rapidly than chlorine concentration drops after generation and injection into a pool or spa environment, and thus ozone by itself provides little residual oxidation potential. However, a combination of ozone and chlorine provides higher efficacy against most mixtures of contaminants while also providing a useful level of residual oxidation potential to react with additional contaminants that may be introduced into a pool or spa after initial treatment. Here, as ozone decomposes into free oxygen atoms and molecular oxygen, other compounds are generated by the oxygen atoms and molecular oxygen that are longer-lived than ozone, and still have a relatively high oxidation potential. As such, the combination of ozone and chlorine provides a higher oxidation potential to the water than either ozone or chlorine used separately.

In a conventional pool installation where chlorine for water treatment is provided via electrolysis of salt added to pool water, and no ozone is used, chlorine concentration may be monitored via use of a redox sensor, wherein oxidation potential is measured to provide an indication of chlorine concentration, with results of such measurements typically being used by a controller to control operation of an electrolysis cell in order to generate more chlorine when needed, or to stop generating chlorine if concentrations are determined to be too high based on a redox measurement. However, as noted, when ozone is used together with chlorine in a pool, spa, or other water treatment application, the higher oxidation potential due to the combined chlorine and ozone may cause a conventional control system to generate more or less chlorine than is desired. Thus, when an ozone generation capability is added to a pool or spa that uses a redox sensor to control chlorine concentrations by control of a salt chlorine generator electrolysis cell, the higher oxidation potential of combined chlorine and ozone can cause a redox sensor and control system to incorrectly "conclude" that the chlorine concentration is too high due to a measured high oxidation potential. Based on a measurement indicating a high oxidation potential, a controller may reduce the generation of chlorine, with a result that concentrations of chlorine in a pool or spa may be reduced to levels that are lower than desirable for providing a longer term residual sanitation capability. This may be mitigated to some extent in systems using a redox sensor by placing the redox sensor in a flow path of a main flow loop or a primary or other bypass loop prior to a point where ozone from an ozone generator enters the flow path. By positioning a redox sensor in the flow path prior to a point where ozone is injected or otherwise enters the flow path, then the sensor will better measure the residual level of oxidation potential provided by chlorine or another halogen in water drawn from a pool or other reservoir before ozone is added. On the other hand, if a control system in a water treatment system using both ozone and chlorine is set to generate chlorine at a constant rate, as in an open-loop control mode (e.g., constant current to an electrolysis cell) without feedback from a sensor or other chlorine concentration indicator, ozone added to the water will tend to oxidize contaminants therein more aggressively than chlorine, reducing unoxidized contaminants with a result that less chlorine is consumed in reacting with remaining contaminants. The stability of chlorine will then typically lead to increasing concentrations of chlorine which may, after a period of time, become unacceptably high.

Figure 2D:
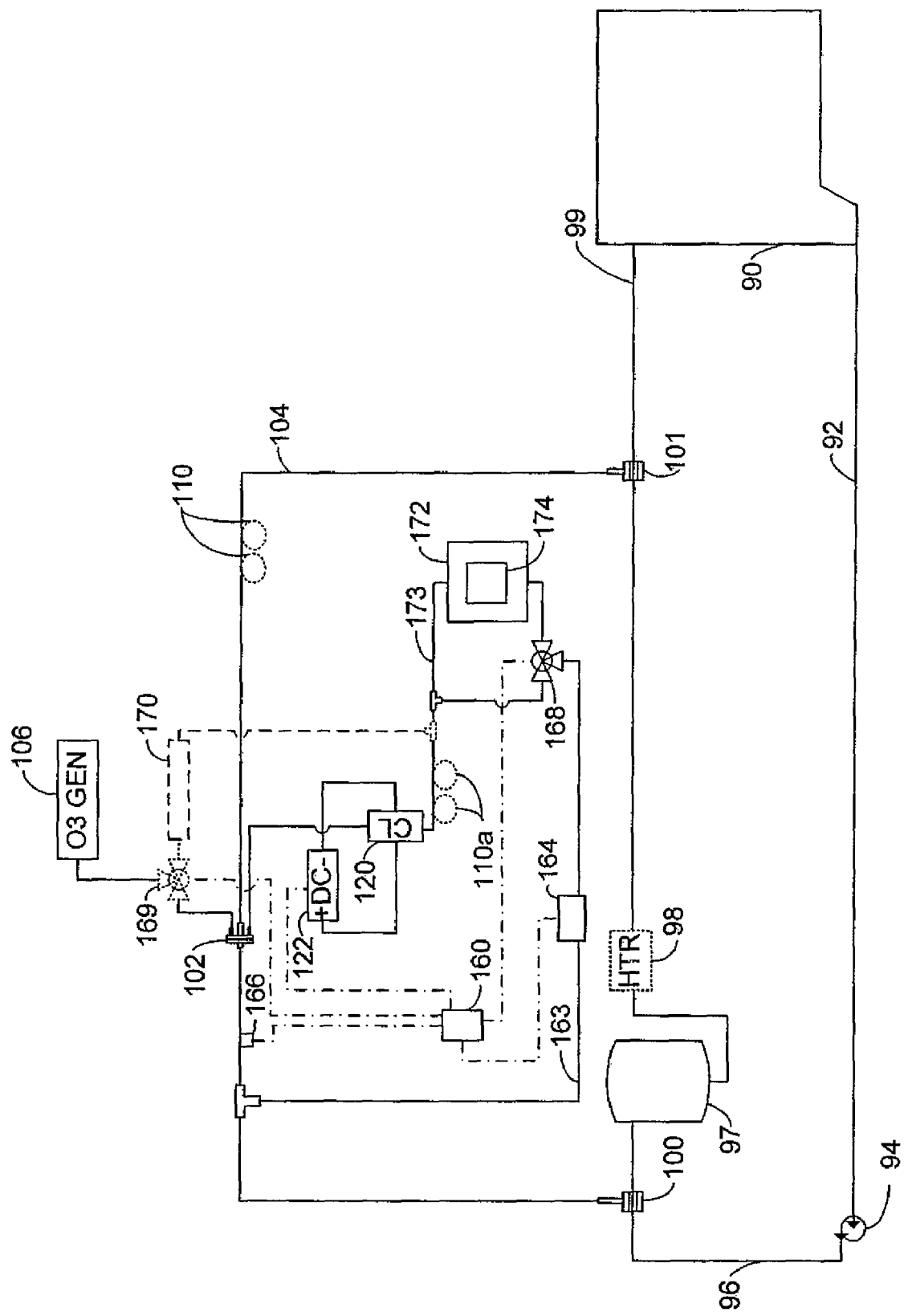
FIG. 2d is a schematic illustration of a main water circulation loop having a bypass loop installed around a filter.

A control system for chlorine concentration in a water treatment system for a pool, spa, or other bathing facility that uses both ozone and chlorine must be able to provide accurate measurement and response to chlorine concentrations without being unduly influenced by effects of ozone such as described above. FIGS. 2c and 2d provide overviews of representative embodiments of water treatment systems of the instant invention that use ozone and chlorine, and include overviews of control systems that use a conventional dye, such as dialkyl-p-phenylenediamine (DPD), together with novel and non-obvious apparatus and methods, to provide measurements of chlorine concentrations without undue influence of ozone so that such measurements may be used by a control system to help more accurately maintain appropriate chlorine concentrations even in the presence of ozone.

In another embodiment illustrated in FIG. 2c, a bypass loop 104 around restriction 80 in main water circulation loop 92, 96, 93a, 93b, 99 includes Venturi injector 102 which may have multiple injection ports. Bypass loop 104 may originate in a fitting 100 after heater 98 or optionally in fitting 100a before heater 98 in main water circulation loop 92, 96, 93a, 93b, 99. An ozone generator 106 which may include a compressor for pumping a gas containing ozone to the Venturi may be coupled to an injection port of Venturi injector 102 directly via tubing or via line 103 and valve 169, which may be a multi-position valve. A motive flow port on Venturi 102 may be coupled to a return segment of a secondary bypass loop 163 which may originate at fitting 161 in bypass loop 104, or, optionally, in a fitting 161a in the main water circulation loop. Fitting 161 (or fitting 161a) may be a conventional "T" or "Y" fitting, a conventional or adaptable saddle clamp, or another fitting that allows a portion of the water flowing in bypass loop 104 (or, optionally, in the main water circulation loop) to flow through secondary bypass loop 163. Motive force for flow through secondary bypass loop 163 is provided by a pressure difference between fitting 161 (or, optionally, fitting 161a) and an injection port on Venturi injector 102, pressure being lower at the injection port. Secondary bypass loop 163 may include a multi-position valve 168 that may selectively route water flowing in secondary bypass loop 163 through a salt erosion feeder cell 172 in which may be placed a block or cake 174 of a salt or a mixture of salts. Valve 168 may be positioned manually or may be positioned responsive to controller 160, which may use chlorine sensor 162 and valve 248 positioned to sample chlorine concentration, as described later herein, in water flowing through secondary bypass loop 163 or optionally in main bypass loop 104 or in main loop 92, 96, 93a, 93b, 99. In embodiments where optional fitting 161a is used, instead of fitting 161, to admit water into secondary bypass loop 163 (optionally from the main water circulation loop), chlorine sensor 162 and valve 248 may be re-positioned (from the location shown in FIG. 2c) to a position where sensor 162 may be used to sample water flowing through secondary bypass loop 163, as described later herein. Controller 160 may also use a measurement of current flowing through electrolysis cell 120 for a given applied voltage to estimate salinity of water flowing in secondary bypass loop 163 and use such information separately, or together with information from chlorine concentration sensor 162 of the instant invention, described later herein, to control position of valve 168. When valve 168 is positioned to route water through erosion feeder cell 172, a quantity of salt or salt mixture is dissolved into water flowing through cell 172, thereby increasing concentration of such salt or salt mixture in water flowing to electrolysis cell 120, which may be energized by power supply 122 responsive to controller 160. Power supply 122 may include voltage and/or current measuring capabilities to support estimates of saline concentration based upon current vs voltage relationships, which may be calibrated for different known saline concentrations in a particular electrolysis cell. When no additional salt or salt mixture is to be added to water flowing in secondary bypass loop 163, valve 168 may be positioned to allow water flow to bypass erosion feeder cell 172 and cause water to flow directly to electrolysis cell 120, which may be de-energized responsive to controller 160, or which may be energized to perform electrolysis on residual concentration of salt in water flowing through secondary bypass loop from main water circulation loop via bypass loop 104. This latter embodiment is useful where salt concentration in the main water circulation loop rises to a point where it becomes undesirable. In other embodiments, valve 168 may be a proportional valve which may be positioned responsive to controller 160 to direct a portion of water flowing through secondary bypass loop 163 into erosion chamber 172 and allow another portion of water flowing through secondary bypass loop 163 to flow through line 171 to be mixed with water flowing in line 173 before being passed to electrolysis cell 120, thereby providing a mechanism for controlling a concentration of salt in water supplied to electrolysis cell 120.

As noted, a special purpose chlorine concentration sensor 162 of the instant invention may be used, e.g., responsive to controller 160, to monitor concentration of chlorine in water drawn directly from main water circulation loop or from bypass loop 104 and into secondary bypass loop 163. Sensor 162 injects a known quantity of DPD dye or another dye or indicator responsive specifically to chlorine concentration, into a known quantity of water drawn from secondary bypass loop 163 or another sampling point and measures a change in optical attenuation at a selected wavelength, as illustrated and explained further in descriptions of FIGS. 3a through 3d, to help estimate chlorine concentration. An optional carbon canister 170 enclosing carbon granules or activated carbon and selectively coupled to ozone generator 106 via multi-position or proportionally controlled valve 169 may be used to generate carbon dioxide via oxidation of carbon by ozone, with resulting carbon dioxide being injected into secondary bypass loop 163 prior to flow through electrolysis cell 120. Injection of carbon dioxide into water flowing through secondary bypass loop 163 and into electrolysis cell 120 results in formation of carbonic acid which may be beneficial in removing concentrations of contaminants (e.g., mineral deposits) on electrode plates in electrolysis cell 120. Carbonic acid may also be used to help adjust a pH level in water in a pool, spa, or other bathing facility, e.g., responsive to a pH sensor 166. In such an application, signals from pH sensor 166 to controller 160 may be used to determine when there is a need to increase pH level, whereupon controller 160 may send signals to adjust position of valve 169 so that all or a portion of a gas mixture including ozone from ozone generator 106 is diverted through carbon canister 170, from which a mixture of carbon dioxide and other gases from generator 106 flow into line 173 through a Venturi or conventional fitting 111, which may include a diffusion injector, such as disclosed in Applicant's prior patent application Ser. No. 11/137,890, which is hereby incorporated herein by reference in its entirety, to be mixed with and dissolve into water flowing to electrolysis cell 120. Optional mixing loops 110a may be included to help carbon dioxide dissolve more thoroughly into water flowing through line 173 to electrolysis cell 120.

FIG. 2d is a schematic illustration of another embodiment of a water treatment system that is similar to that shown in FIG. 2c, except as noted above, filter 97 is used to provide a flow restriction to promote a bypass flow through bypass loop 104, and chlorine concentration sensor 164 may be of a different embodiment from sensor 162, as described later herein. Chlorine concentration sensor 164 also uses a photodetector to determine attenuation of light in a sample of water of known volume taken from secondary bypass loop 163 to which a known quantity of DPD dye or similar indicator chemical responsive to chlorine concentration has been added. Additional detail about operation of chlorine sensor 164 is provided in subsequent descriptions association with FIGS. 3e through 3f.

FIGS. 3a and 3b illustrate, in cross-sectional view, a chlorine concentration measurement sensor 162, which may be conventionally coupled, e.g., as by a T-fitting 220, or attached by use of Applicant's adaptable saddle clamp, as described in application Ser. No. 11/137,890 to a water line 218 in which is flowing water to be sampled for chlorine concentration. For example, sensor 162 may be coupled to a water line for secondary bypass loop 163, as illustrated in FIG. 2c. In FIG. 3a, sensor 162 is shown in its normal "relaxed" position, and in FIG. 3b, sensor 162 is shown in its active measurement position. In FIG. 3a, a passageway 216 from line 218 provides a path for water in line 218 to flow into attenuation measurement cavity 205 of sensor assembly 162 when valve 248 is closed, e.g., responsive to a command from controller 160 to permit a chlorine concentration measurement. With valve 248 closed, pressure in passageway 216 increases so that water pressure on a face of piston 206 exceeds a bias of spring 210, causing piston 206 to be forced into cavity 202 of chamber 203 within case 200. Chamber 203 may be sealed by a cap 212 or other closure mechanism, which may be conventionally and sealably attached, e.g., as by threads or an adhesive, to main body of case 200. Cap 212 may have a raised ridge 209, points, a conical taper on its internal face, or other features to prevent piston 206 from seating completely flush with cap 212, so that water flowing into cavity 205 may develop hydraulic force across the full face area of piston 206. As piston 206 is forced inward, an opposite end 208 of piston 206 is forced into dye metering cavity 204, displacing therefrom a measured quantity of DPD dye, which dye is forced to flow from metering cavity 204 into line 228 by action of check valves 232, 242 installed so as to cause one-way flow from DPD dye reservoir 246 through line 244 and chamber 204 into line 228. Check valves 232, 242 may be conventional ball and spring check valves or other valves that cause a one-way flow from reservoir 246 to line 228. Double O-ring seals 207 or other conventional sealing techniques, such as may be used in medical syringes, may be used to help prevent leakage of dye from dye metering chamber 204 into spring cavity 202. Dye forced from metering chamber 204 flows through line 228 and passageway 226 and into water flowing through passageway 216 into attenuation measurement cavity 205 of chamber 203 as piston 206 is forced further into cavity 202. In some embodiments, a pressure relief opening or port 202a may be used to release and admit air into cavity 202 as piston 206 moves within chamber 203. Opening 202a may optionally be placed on a lower side of housing 200 and a length of tubing may optionally be connected from opening 202a to a drain line to provide for controlled discharge of any fluid that leaks by O-ring fittings or other seals. In another optional embodiment, a length of tubing 107 may be used to couple pressure relief port 202*a* with an inlet to Venturi 102 so that a lower pressure at the Venturi inlet port may be used to create an increased pressure difference across piston 206 if needed to insure the desired motion of piston 206 when a chlorine concentration measurement is initiated by controller 160 or by other means. Where required, controller 160 may also de-energize a compressor in ozone generator 106, or re-position valve 169, during a chlorine measurement interval, to help insure pressure at Venturi inlet is sufficiently low so as to create a partial vacuum in cavity 202 to support movement of piston 206 responsive to increased pressure of water in line segment 163*a* when valve 248 is closed. Relative diameters and/or volumes of metering chamber 204 and attenuation measurement cavity 205 of chamber 203 may be selected to cause a desired concentration of DPD dye or other indicator chemical within water that flows into attenuation measurement cavity 205. After a brief wait (typically a few seconds) to permit adequate mixing and reaction of DPD dye, water, and chlorine therein, light source 250 (FIG. 3*c*) and photodetector 252, which may be energized by controller 160 and/or power supply 122, are used to measure attenuation along light path 253 through attenuation measurement cavity 205. A number of measurements may be repeated at intervals of nominally one-quarter to one second to determine when adequate mixing and equilibrium conditions have been reached, as indicated by a selected number of measurements (e.g., three to five) being within a selected tolerance of a sliding window average of a selected number of measurements (e.g., 3 to 10). Chlorine concentration within the sample of water admitted into attenuation measurement cavity 205 may then be estimated by known relationships between light attenuation and chlorine concentration for a selected measurement dye and a known dye concentration within reservoir 246. Light source 250 and photodetector 252 may be conventionally mounted using threads, adhesive and sealing cements or caulks, or other means in openings in walls of container 200 so as to provide a light path from source 250 to detector 252 while preventing leakage of water from cavity 205. Sensor assembly 162 may be cycled on occasion with only water in a replacement reservoir 246 in order to allow periodic recalibration of attenuation measurements made with source 250 and detector 252. In some applications, source 250 and detector 252 may be removed and inserted into a separate fixture for periodic recalibration, or the entire sensor assembly 162 may be removed from fitting 220 and injected through passageway 216 with solutions of known chlorine concentrations in order to support periodic recalibration of light source 250 and detector 252. In some embodiments, an optical fiber or other passageway for light may be routed around the outside of case 200 and used to provide a separate light path of known attenuation between light source 250 and detector 252. A polarizer, small electro-mechanical shutter, or other means may be used to control flow of light through this alternate light path. The alternate light path may then be used to support calibration of detector 252 and source 250, or may be used to support comparative measurement of a known attenuation path with attenuation of light passing through water with chlorine and DPD dye in cavity 205. Switching between light paths to support calibration and/or measurements may be performed by a micro-controller integrated into measurement unit 162 or by controller 160.

Fitting 220 (FIG. 3*a*) may include a Venturi-like passageway, or an end of interconnect tubing 214 may be cut at a slant, so as to create an area of low pressure at an end of tubing 214 positioned in fitting 220 when flow is restored in line 218 after valve 248 is opened at an end of a measurement cycle. When flow is restored in line 218, pressure within passageway 216 is reduced, allowing piston 206 to be restored to its relaxed position by bias from spring 210, which may be aided by a reduced pressure within fitting 220 as noted above. In embodiments where tubing 107 is used to connect pressure relief port 202*a* to an inlet to Venturi 102, valve 169 (FIG. 2*c*, 2*d*) may be repositioned and/or a compressor within ozone generator may be energized to increase pressure within line 107 to atmospheric or above to enhance a restoring force on piston 206. As piston 206 is restored to its relaxed position, as in FIG. 3*a*, a combined effect of check valves 232, 242 and atmospheric pressure within, or operating upon flexible sides of, reservoir 246, causes chamber 204 to be refilled with DPD dye from reservoir 246 in preparation for a subsequent chlorine measurement cycle. Operation of light source 250 and detector 252 may be controlled by controller 160 (FIG. 2*c*, 2*d*), which may also receive digital or analog data or signals from detector 252, which data or signals may be used to estimate chlorine concentration as noted above and/or be used to selectively operate valve 168 and power supply 122 for electrolysis cell 120 (FIG. 2*c*) in order to restore chlorine concentration to a selected level. New measurement cycles may be repeated at selected intervals, or based on other criteria or manual intervention by a human operator, by repositioning of valve 248 (FIG. 3*a*). In some installations, valve 168 (FIG. 2*c*) may have a shutoff position that may be controlled by controller 160 and serve the function of valve 248 (FIG. 3*a*) to cause a chlorine concentration measurement cycle when desired.

For some applications, it may be desirable to have a longer path length for light path 253 through attenuation measurement cavity 205 than would be provided by one crossing of the cavity in order to increase sensitivity for readings where attenuation per unit path length is low. FIGS. 3*c* and 3*d* illustrate other embodiments that may be used for attenuation measurement cavity 205. Whereas chamber 203 and cavity 205 may have a circular interior cross section in some embodiments, as in FIGS. 3*a* and 3*b*, in other embodiments, chamber 203 and cavity 205 may be formed into other shapes, such as illustrated in FIGS. 3*c* and 3*d*, as by injection molding or other known techniques, and mirrored surfaces (e.g., 251, FIG. 3*c*, 3*d*) may be deposited or otherwise formed on at least portions of interior surfaces of cavity 205 so that light from a source 250 may be folded so as to pass through a water, chlorine, and dye solution in cavity 205 more than one time (e.g., along light paths 253*a*, 253*b*) before arriving at sensor 252. Pistons corresponding to piston 206 may be formed in shapes to match interior surface shapes such as shown in FIG. 3*c*, 3*d*, with selection of appropriate materials for use as sliding seals to prevent leakage of water from attenuation measurement cavity 205 into spring cavity 202. Such seals may also be used as wipers to prevent buildup of deposits on reflective surfaces which could otherwise interfere with measuring attenuation through a fluid in cavity 205. Reflective mirrored surfaces may be made of materials or deposits that are hard and resistant to wear or scratching by sliding seal materials, or may be coated with hard transparent materials. Light paths may be provided through case body 200 between light source 250 and cavity 205, and between cavity 205 and sensor 252, or case body 200 may be made of a material that is transparent or has limited attenuation at the wavelengths selected for light source 250 and measured by sensor 252. Where the case body 200 is transparent, it may be desirable to provide a coating, sleeve, cover, or housing for case body 200 or the overall sensor assembly 162 to prevent ambient light from interfering with sensor measurements.

FIGS. 3e and 3f illustrate another embodiment of a chlorine concentration measurement sensor assembly 164 wherein chlorine concentration is determined by attenuation of light passing through a volume of water into which a measured and known quantity of DPD dye or other chlorine concentration indicating chemical has been injected. FIG. 3e shows sensor assembly 164 in its normal flow-through position, and FIG. 3f shows sensor assembly 164 in a configuration wherein flow through a section 268 of a normal flowpath is temporarily suspended and a measured quantity of DPD dye is injected into water flowing into section 268 so that chlorine concentration may be estimated by measuring attenuation of light passing from a light source 250 to a detector 252 through a mixture of water, chlorine, and DPD dye within pipe section 268. In a normal, flow-through position, as shown in FIG. 3e, when chlorine concentration is not being measured, valve shaft 262 is positioned within tube 263 so that openings 264, 266 in shaft 262 are aligned with openings in tubing sections 270, 268, 272 attached in communicating relationship with tubing 263 so as to permit flow through those sections of water in which chlorine concentration is to be measured. O-rings or other sealing devices 265 may be used to prevent or reduce leakage between valve shaft 262 and tube 263. Position of valve shaft 262 is controlled by a solenoid, servomotor, stepper motor, or similar control device 260, which motor or other control device may be responsive to control signals (which may include application or removal of power) from a control unit or controller (e.g., 160, FIG. 2d). When a measurement of chlorine concentration in water flowing through assembly 164 is to be made (e.g., on a periodic basis or in response to some other criteria), motor or control device 260 causes valve shaft 262 to be rotated (or optionally translated) within tube 263 so that a new orientation or position of openings 264, 266 no longer permits flow of water from tubing 270 through tubing section 268. As motor or control device 260 causes shaft 262 to be rotated (or optionally translated), a cam 274, which may be attached to a disk or other structural support configured to rotate (or translate) along with shaft 262 so as to engage a plunger 276 on a dye pump 278 and pump or otherwise dispense a measured quantity of dye solution from reservoir 246 into water within tubing section 268, as illustrated in FIG. 3f, either just before or after flow of water through section 268 is stopped due to rotation (or translation) of openings 264, 266 in shaft 262. After flow through section 268 is terminated, light source 250 and detector 252 may be used to measure attenuation of light along path 253 through a mixture of water, chlorine, and dye within tubing section 268. A delay ranging from about a second to a minute or more may be used prior to making attenuation measurements to permit distribution, mixing, and reaction of injected dye with chlorine in water in section 268. Instead of or in addition to a programmed delay, which may be implemented by a controller 160 (FIG. 2d), a series of attenuation measurements may be made and compared (e.g., directly or via a sliding window average technique), and a criteria such as a change between the last two to five measurements differing by less than some percentage (e.g., 5 or 1 percent) may be used to determine that equilibrium in the distribution and reaction of the injected dye has been reached. The measured attenuation at that point may then be used to estimate the concentration of chlorine in water within 268, which should provide an accurate estimate of the concentration of chlorine in water normally flowing through assembly 164, where such water may enter assembly 164 through tubing section 270 from a source, such as secondary bypass loop 163 (FIG. 2d) and be returned through tubing section 272 (e.g., to continue flowing in secondary bypass loop 163, as in FIG. 2d). After a measurement period is completed, motor or other control device 260 may be operated again to restore flow through tubing section 268 and to allow plunger 276 to return to its normal position, drawing a measured amount of dye from reservoir 246 into dye pump 278 in preparation for a subsequent measurement cycle. Controller 160 (FIG. 2d) may use results of chlorine concentration measurements to operate other valves (e.g., valve 168) and other devices (e.g., power supply 122 for electrolysis cell 120) to bring chlorine concentration in water in loop 163 to a desired level. If it is desirable to maintain a flow of water from input tubing 270 to output tubing 272 so as to maintain flow in an attached source of water (e.g., bypass loop 163, FIG. 2d), then assembly 164 may be designed to divert water flow through another path while a chlorine concentration measurement is being made on water within tubing section 268. For example, openings 264, 266 through shaft 262 may have right angle bends so as to allow assembly 164 to function as a multi-position valve, switching flow of water from one path (e.g., loop 268) to another path or loop, as will be known to those skilled in such arts.

Figure 4B:
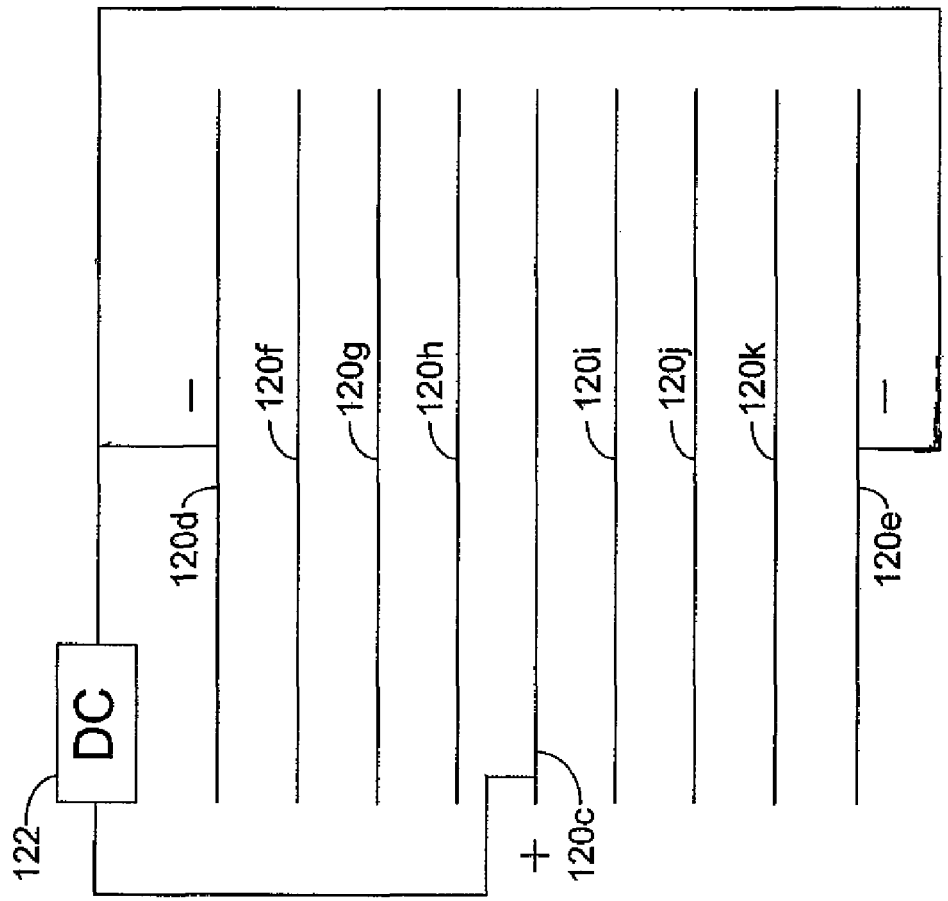
FIGS. 4a, 4b, and 4c are schematic illustrations of different embodiments of electrode plate configurations that may be used in an electrolysis cell.
Figure 4A:
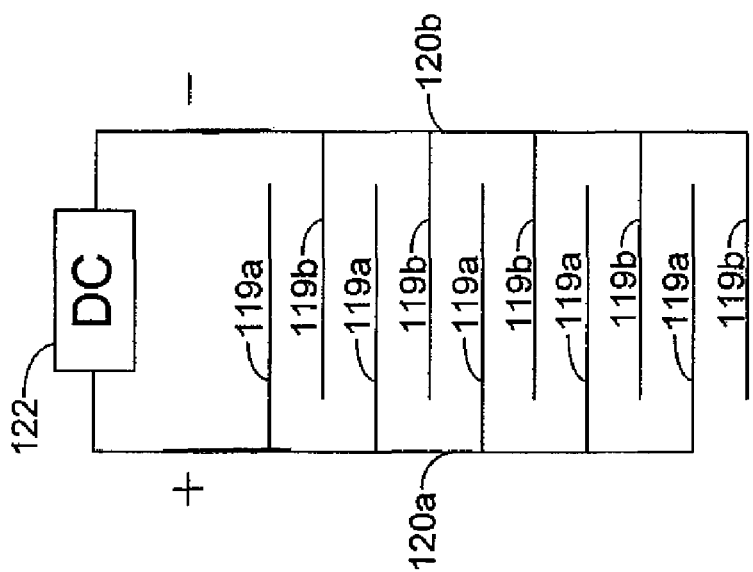
Figure 4C:
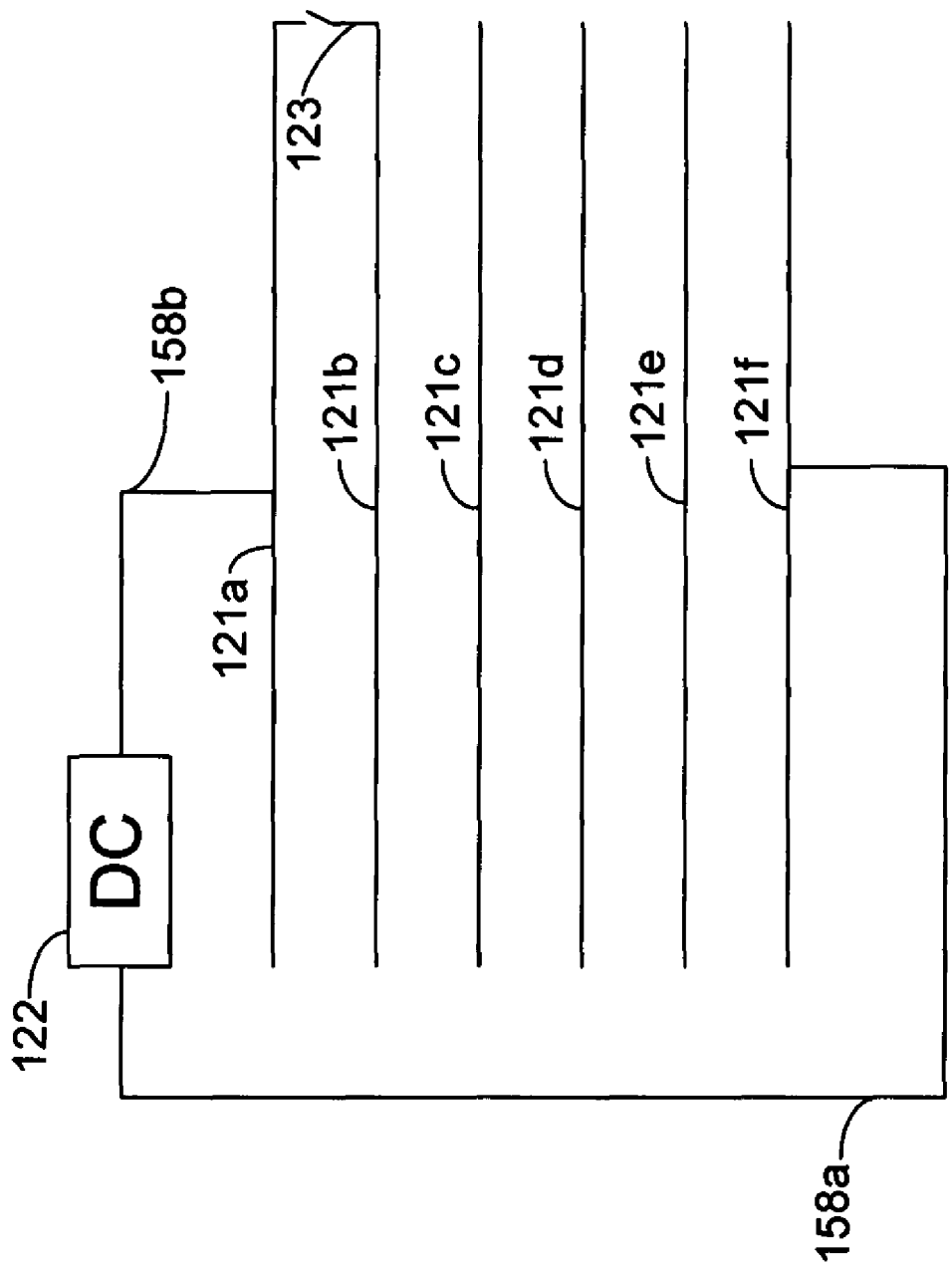

As noted earlier herein, in some applications wherein an electrolysis cell is used to generate a halogen gas or other halogen compounds from a halogen salt or mixture of salts, there may be a buildup of calcium or other deposits on surfaces of electrolysis plates, which deposits may interfere with electrical conductivity from plates to ions in water flowing through such electrolysis cell, thereby reducing electrolysis performance, and, in severe situations, deposits may also reduce or block flow of water through an electrolysis cell. An acid may be introduced into water flowing through an electrolysis cell to react with and remove calcium or other deposits on plates within an electrolysis cell, as in an example shown earlier herein for generating and injecting carbon dioxide to form carbonic acid, and in another example described in application Ser. No. 11/137,890 for injecting hydrochloric, acetic, or another acid into water flowing through an electrolysis cell. However, buildup of mineral deposits on plates in an electrolysis cell may also be controlled to a degree by the manner in which electrical potentials are applied to electrode plates in an electrolysis cell, as explained later herein. In some embodiments, electrode plates may be made of titanium and may have a coating of ruthenium oxide on one side (hereinafter "single-sided") or on both sides (hereinafter "double-sided"). FIGS. 4a and 4b (adapted from FIGS. 3a and 3b in application Ser. No. 11/137,890) illustrate two configurations that may be used for applying electrical potentials to electrode plates in an electrolysis cell. In an example embodiment as shown in FIG. 4a, adjacent electrical plates 119a, 119b are connected to different poles of a direct current (DC) power supply so that each plate, except end plates, is positioned between plates of opposite polarity, and end plates are adjacent to a plate of opposite polarity. In such a configuration, electrical path lengths through a saline water solution flowing through the cell are short, resulting in relatively large current flows, typically around 30 amps or more, for relatively low applied voltages, e.g., 4 to 5 volts. However, power supplies needed to supply currents in the range of 30 amps or more are typically more expensive than power supplies needed for an series plate configuration as shown in FIGS. 4b and 4c. In a configuration and embodiment as illustrated in FIG. 4b, electrical potentials are applied directly to only outer plates 120d, 120e and to plate 120c in a central position so that other plates (e.g., 120f, 120g, and 120h, and 120i, 120j, and 120k) are at floating potentials between the potentials applied to inner plate 120*c* and a corresponding outer plate 120*d*, 120*e*. Although FIG. 4*b* shows a center electrode 120*c* at a positive potential and outer electrodes 120*d*, 120*e* to either side at a negative potential, electrode plates may also be arranged with an electrode plate having a positive potential on one side and an electrode plate having a negative potential on an opposite side as shown in FIG. 4*c* so that electrical potential varies in a more or less linear and uniform manner across other electrode plates in the electrolysis cell. In some applications and embodiments, an electrical connection 123 (e.g., a wire and switch, a jumper, relay, screw, or another mechanism) may be provided to permit an outer electrode plate (e.g., plate 121*a*) to be electrically connected to an inner electrode plate (e.g., plate 121*b*) so that the same electrical potential from power supply 122 is dropped over a shorter distance (e.g., between plate 121*a* and plate 121*b* in FIG. 4*c*), effectively increasing field strength and thereby increasing current in a solution passing through electrolysis cell between plate 121*b* and plate 121*e*. This higher current may allow for increased production of chlorine (or another halogen) and may be useful for maintaining output of chlorine or another halogen with lower salt concentrations, e.g., 2,000 ppm versus 3,000 ppm, in a solution flowing through such an electrolysis cell. Using an electrical connection to electrically connect an outer electrode plate with an adjacent electrode plate may be a less expensive alternative for controlling current through an installed electrolysis cell than using a variable transformer or other technique for controlling voltage and current through an electrolysis cell. Typical power supply voltages and currents for a "stacked plate" configuration as shown in FIG. 4*c* are 27 volts and 5 amps, where "full-size" plate dimensions are approximately 1 inch by 7 inches by 0.05 inches or less in thickness, but where current flow is also dependent upon concentration of a salt in water passing through an electrolysis cell. This voltage and current may be easily by supplied by a small solid-state switching power supply such as typically found in home computers. Such an assembly may be used, for example, in supplying chlorine for an average sized residential swimming pool. For other applications, "half-size" plates (e.g., 1 inch by 3.5 inches long) may be used, which for the same supply voltage and salt concentration will reduce typical current flow to 2.5 amps. However, since production of chlorine or other halogens depends upon current flow, current flow may be increased, for example to 4 amps at 24 volts, by shorting outer plates as noted earlier, but increased current flow may also lead to more rapid deterioration of electrode plates. For home spa applications, "quarter-size" plates (e.g., approximately 1 inch by 1.75 to 2 inches) and a 14 volt power supply may be used for production of chlorine or another halogen or other beneficial compounds. In such applications, with a 14 volt power supply, 6 plates typically operate at approximately 300 milli-amps supply current, 5 plates operate at approximately 500 ma supply current, and 4 plates operate at approximately 800 ma supply current, all in a "stacked" configuration as shown in FIG. 4*c*.

In some embodiments and applications, the principal polarity of an electrical potential applied by power supply 122 to electrode plate 120*c* and plates 120*d* and 120*e* may be periodically reversed (e.g., every 30 minutes or so), thereby reversing flow of current from selected surfaces of electrode plates into a salt solution flowing through such an electrolysis cell. This periodic reversal of principal polarity may help reduce buildup of, and even help remove, calcium or other deposits which may form on electrode plates under some operating conditions. Periodic polarity reversal may be accomplished, for example, through use of a timer and a relay, a rotary switch controlled by a stepper motor, electronic switching, or other conventional method. Another way to reverse potential applied to electrode plates is to charge a capacitor to twice the voltage being applied across a set of electrode plates and periodically switch the charged capacitor into the circuit for the electrode plates thereby driving the set of electrode plates with reversed polarity, and hence reversing polarity, at least briefly, on the set of electrode plates. Such polarity reversals can help reduce or remove calcium and other deposits on electrode plates.

In some embodiments, an amount of chlorine or other halogen produced by an electrolysis cell may be controlled by using pulse width modulation of an electrical potential supplied to electrode plate 120*c* and electrode plates 120*d*, 120*e* by power supply 122. Pulse width, frequency, amplitude, and/or duration of pulse width modulation within a selected interval of time may be controlled responsive to a timer or responsive to a sensor, such as a conventional redox sensor or a redox sensor having a controller as described later herein. As noted, in some embodiments, power supply 122 may include a solid-state switching power supply, such as conventionally used for home computers, to help provide and control voltage and current supplied to electrode plates in an electrolysis cell. For some applications, use of a solid state switching power supply provides better control and other advantages over conventional use of a transformer to provide power for electrode plates. For some embodiments, particularly in embodiments used in conjunction with a spa, a potentiometer may be used to control an RC time constant in order to control parameters of a pulse width modulation waveform which in turn controls amount of chlorine or other halogen produced by an electrolysis cell. As noted earlier, switching polarity of supply voltage periodically may help reduce buildup of calcium or other deposits on electrode plates. Conventionally, doubled-sided electrode plates are used so that efficient production of chlorine continues even when supply voltage polarity is reversed. However, double-sided electrode plates are more expensive than single-sided electrode plates, so part of the novelty of the instant invention is to combine periods of pulse-width modulation for control of production of chlorine or other halogens with periods of polarity reversal to allow more effective use of less expensive single-sided electrode plates. Embodiments such as shown below may also avoid additional costs for a second timer as is required in conventional installations that provide for periodic reversal of voltages supplied to an electrolysis cell.

As shown in FIG. 5*a*, a double-pole, double-throw switch, relay, or other device 126 coupled to a timer 129 may also be used to periodically change polarization of a potential supplied by power supply 122 to electrode plates 121*a*, 121*f* in electrolysis cell 125 in order to promote cleaning of deposits from plates or to reduce build-up of such deposits. A "stack" of single-sided plates acts electrically somewhat like a diode in that such an assembly provides more resistance to current flow in one direction than in the opposite direction. A resistor 128 may be used as shown in FIG. 5*a* to bias the potential experienced by electrode plates in electrolysis cell 125 so as to produce a time-varying supply voltage as shown in FIG. 5*b*. The duration of the "reversed" voltage, and the current flow during the reversal, is typically sufficient for removal of calcium or other deposits from electrode plates where water flow rate through an electrolysis cell is sufficient to remove loosened deposits. Where flow rates are lower, additional current may be needed during "reversals" to help free calcium deposits.

Figure 6:
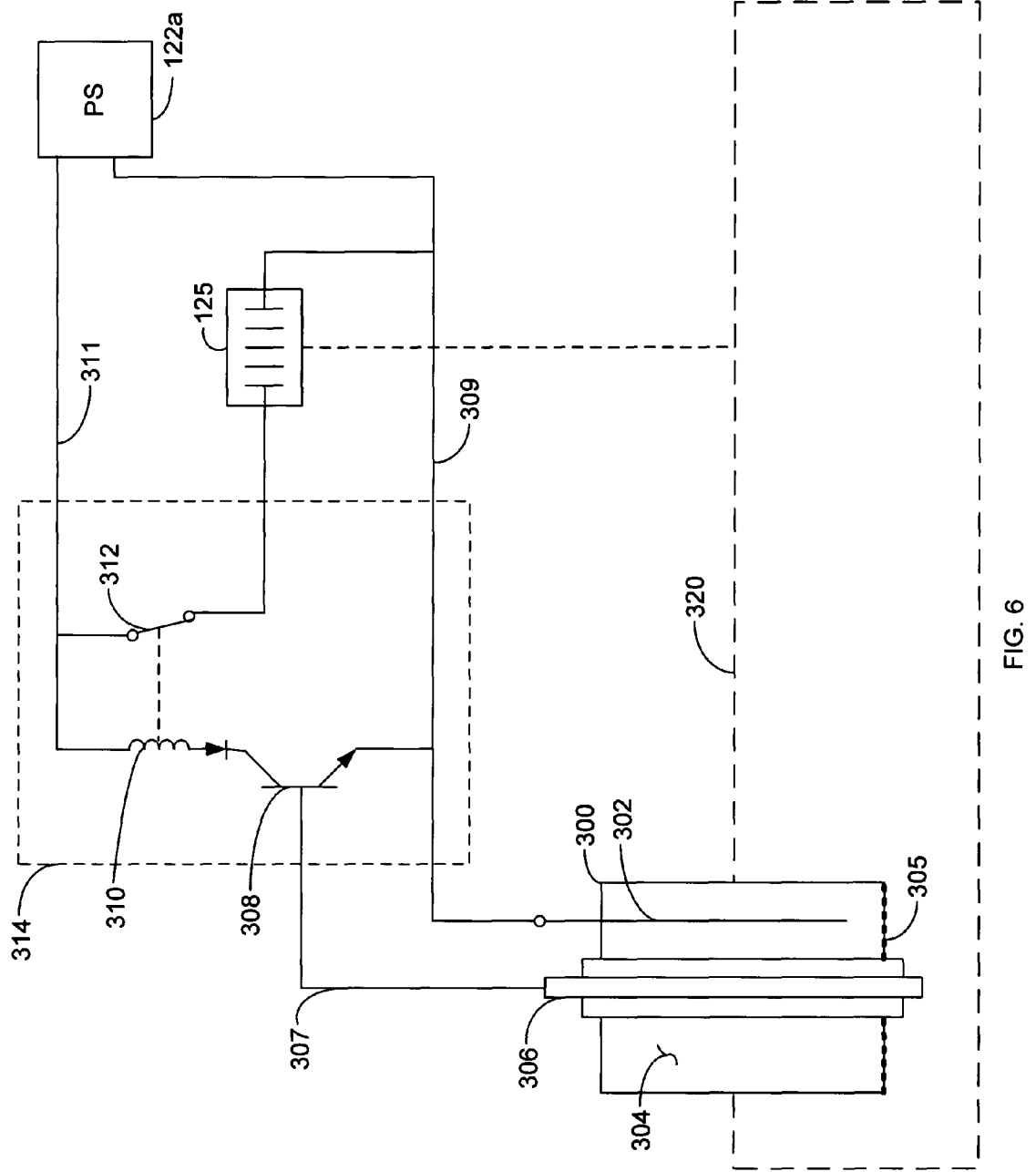
FIG. 6 is a schematic of a circuit that may be used with a redox sensor to control chlorine levels in a body of water.

It was noted earlier herein that a redox sensor may be used to help monitor and controls level of chlorine in water in a pool, spa or other container. Also as noted earlier, it may be generally desirable to place such a redox sensor in the water flow just before water is ozonated in order to minimize undesired effects of the high oxidation potential of ozone on chlorine generation. FIG. 6 illustrates a simple but novel approach that may be implemented to allow a redox sensor to be used to control generation of chlorine within an electrolysis cell. In FIG. 6, a conventional redox sensor 300, which may comprise a central insulated platinum probe 306 and a silver probe 302 positioned in a cavity 304 filled with a compound which may include potassium chloride and silver, is positioned such that a portion of probe 306 and a membrane 305 are in contact with a body of water 320 in which oxidation potential is to be measured. An electrical connection 307 extends from probe 306 to a transistor 308 and another electrical connection 309 extends from probe 302 to power supply 122a. When oxidation potential in body of water 320 exceeds a desired amount, a potential difference developed between probe 306 and probe 302 causes transistor 308 to turn on, resulting in a flow of current from power supply connections 311 through coil 310 which may cause normally closed contact 312 to open, thereby interrupting flow of current to, and chlorine production within, electrolysis cell 125 which is connected by communicative flow to body of water 320. Thus, assembly 314 may be used to provide an inexpensive controller for chlorine levels within a body of water 320.

FIGS. 7a through 7f illustrate features of a multipurpose enclosure 700 that may be used to implement many of the components of a water purification system such as described herein and in Applicant's prior patents and patent applications. In particular, and as will be described more fully below, innovative features of enclosure 700 permit enclosure 700 to be used, in some applications, with electrode plates 720 (FIG. 7c) installed to implement a salt-generator electrolysis cell as described earlier herein. However, enclosure 700 may also be used with an ultraviolet lamp 730 (FIG. 2c) installed internally, rather than electrode plates, to implement an ozone generator or an advanced oxidation unit as explained below. In some embodiments and applications, enclosure 700 may also be used to enclose a rod, cake, or block 740 of a selected salt that may be dissolved in water or another liquid passing through enclosure 700, and thereby serve as a source of salt, or salt erosion feeder cell (e.g., reference number 172, FIGS. 2c, 2d), for salt generator electrolysis cells as described earlier herein.

Figure 7A:
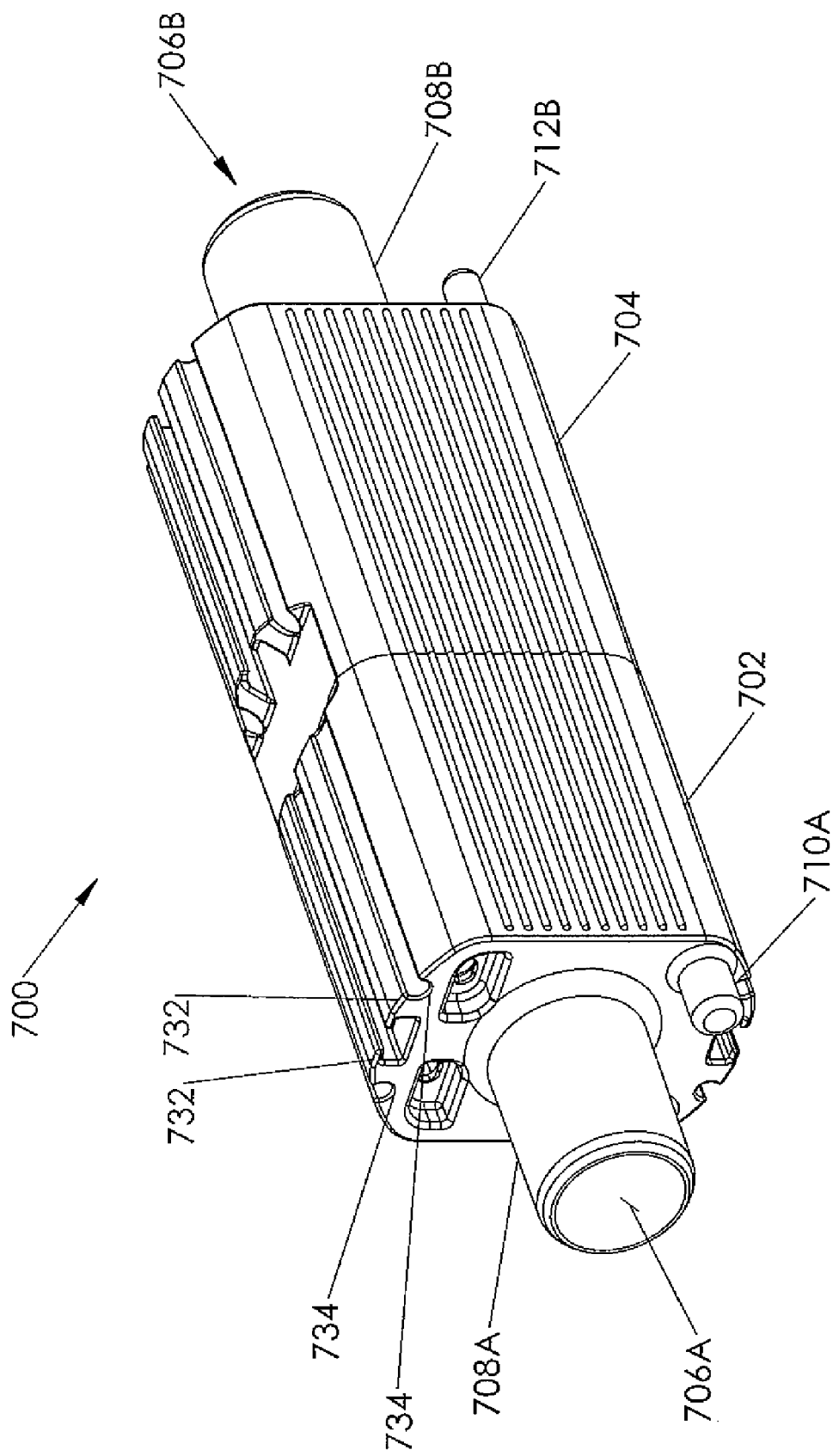
FIG. 7a is an isometric view of a multipurpose enclosure that may be used to implement salt generators or other components of water purification systems of the instant invention.
Figure 7A:
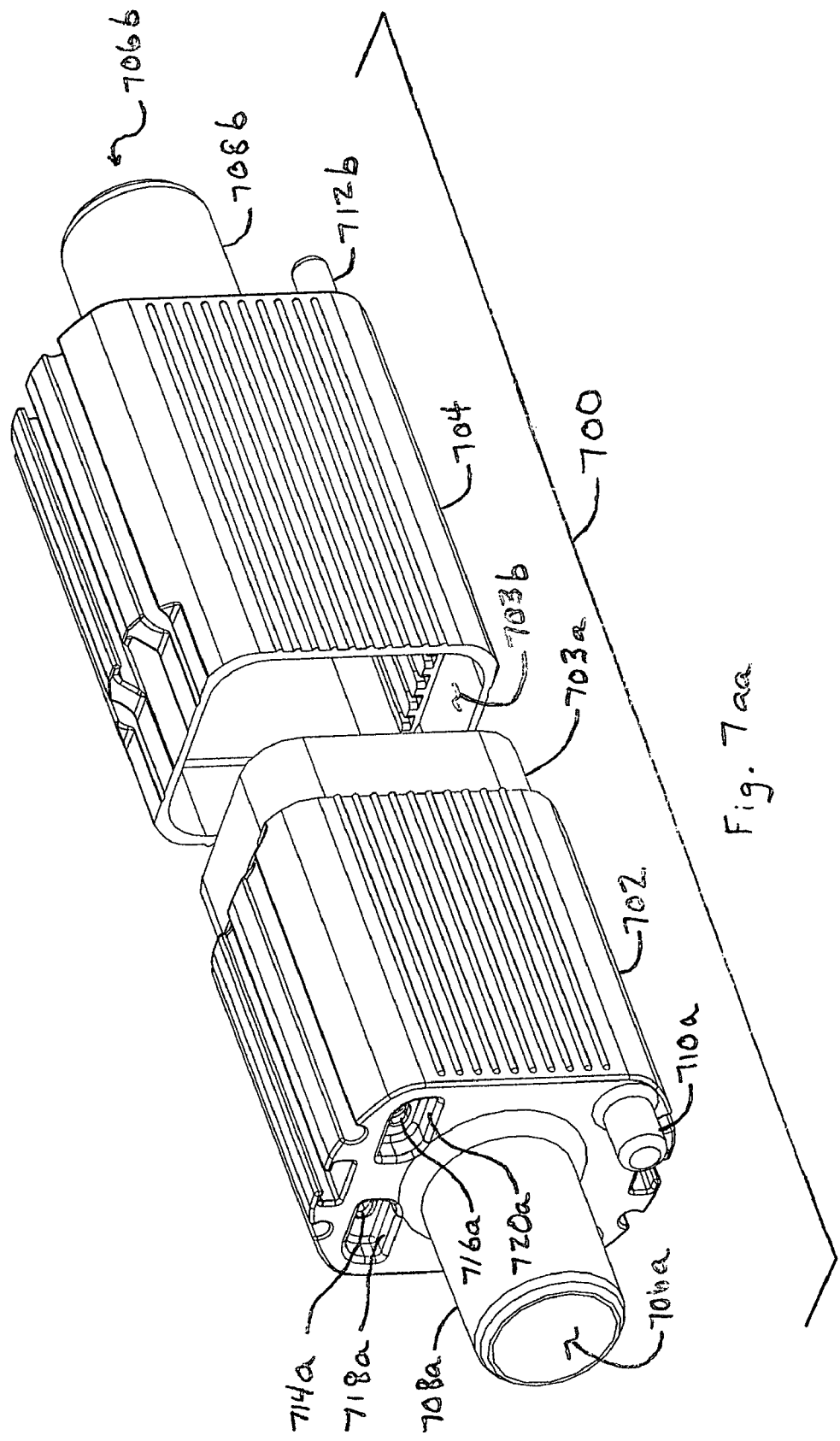
Figure 7E:
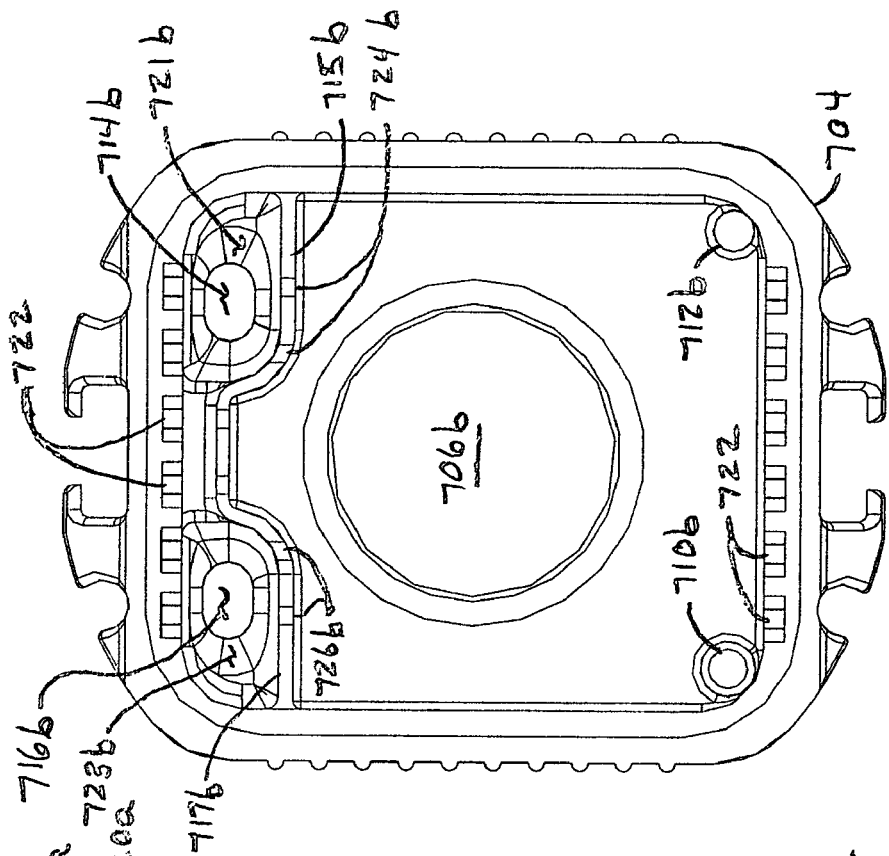

Features of enclosure 700 that support these multiple applications include two sections 702 and 704, that may be formed of a plastic material such as PVC using an injection molding process, which when coupled together using conventional nesting male 703a and female 703b fittings (FIG. 7aa), or another conventional joining technique, provide an enclosure having an inner chamber 705, as shown in FIG. 7b, which is an isometric view of an open end of section 702 rotated from the view of FIGS. 7a and 7aa. Sections 702 and 704 may be identical except for male and female fittings 703a, 703b, respectively. Conventional gaskets or O-rings, or a sealing compound such as silicon caulk, may be used to provide a gas or water-tight seal between fittings 703a and 703b when assembled. Tubular extensions 708a, 708b, smaller extensions 710a, 710b, and generally smaller extensions 712a, 712b, permit attachment of lines for transport of liquids and/or gases through enclosure 700 and chamber 705 as needed for a particular application. Extensions 708a and 708b are normally formed (e.g., injection molded) with ends open and extensions 710a, 710b, 712a, 712b are normally formed with ends plugged or capped, but so that ends may be easily opened by drilling or cutting when needed for a particular application. Openings 706a, 706b in extensions 708a, 708b may be sealed via caps, plugs, or other conventional means when not needed in a particular application. Openings 714a and 716a allow wires or electrical fittings to penetrate ends of enclosure and recesses 718a and 720a (and recesses 723b, 721b, FIGS. 7e, 7f) permit sealing of enclosures using silicon caulk or another material having good sealing and electrical insulation properties. These openings may also be conventionally sealed with caulk, plugs, or by other means when not needed for a particular application. Similar openings and recesses may also be formed in section 704. Ridges 732 and/or grooves 734 may also be formed on outer walls of sections 702, 704 to permit one or more enclosures 700 to be easily mounted on a rack or joined together using "T"-shaped fittings and/or rods. Ridges 732 and/or grooves 734 may also be used to support convenient attachment of power supplies or other components to enclosures 700. Symmetry of sections 702 and 704 allows these sections to be joined together with extensions 710a, 712a on the same side as extensions 710b, 712b, or with extensions on opposite sides where desired to promote a cross-flow across components inserted into chamber 205.

Figure 7D:
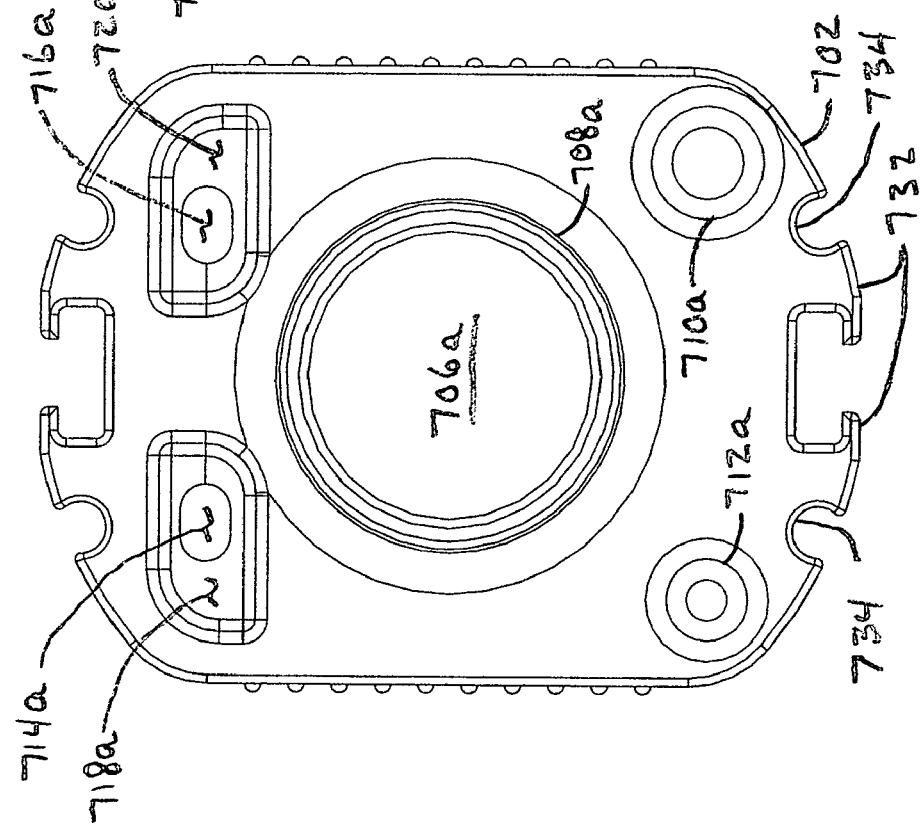
Figure 7L:
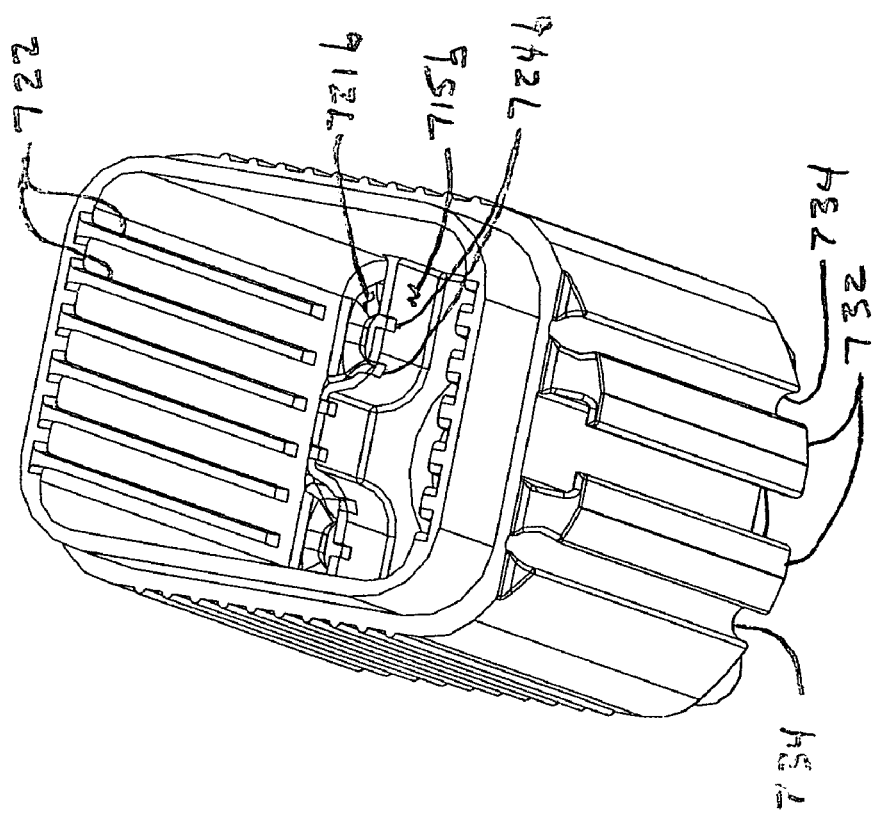

For applications where enclosure 700 is used to implement an electrolysis cell, typically 4 to 6 electrode plates 720 (FIG. 7b) are inserted into groves 722 (FIG. 7b) formed into opposite walls of sections 702 and 704. Electrical contact between outer electrode plates and an externally mounted power supply may be provided via electrical wires which may be spot-welded or otherwise attached to outer electrode plates and extended through slots 724b, 726b formed in ridges 717b, 715b (FIGS. 7e, 7f) and thence through openings 716b, 714b and sealed therein by use of silicon caulk or similar material placed in cavities 723b, 721b (FIGS. 7e, 7f) and cavities 720a, 718a (FIGS. 7d, 7aa). In some embodiments, electrical contact between outer electrode plates and an externally mounted power supply may be provided by use of electrical contact fittings placed within cavities 723b and 721b which make contact via spring fingers or a similar mechanism to portions of electrode plates which extend into or near cavities 723b and 721b through slots 726b, 724b. Terminal posts for such electrical fittings may extend through openings 716b, 714b and be sealed with caulk, gaskets, or other conventional means. Electrical connections may provide for outermost electrode plates to be shorted together during or after assembly of an electrolysis cell module when desired for a particular application as described earlier in conjunction with FIG. 4c herein.

When multipurpose enclosure 700 is to be used to support implementation of an ozone generator, an ultraviolet lamp 730 having electrical leads 731, 733 and capable of emitting vacuum ultraviolet radiation including wavelengths sufficiently short (generally less than about 210 nm) to disassociate diatomic oxygen (leading to formation of ozone) may be inserted into chamber 705 instead of electrode plates 720. Such lamps 730 normally have enclosures made of quartz that transmits vacuum ultraviolet radiation in addition to longer wavelength ultraviolet radiation. Other sources of vacuum ultraviolet radiation such as a strip of light emitting diodes or vertical cavity surface emitting lasers capable of emitting ultraviolet radiation directly or via frequency doubling techniques may also be used in lieu of lamp 730. Lamp 730 or other vacuum ultraviolet emitting device may be extended at least partway into openings 706a, 706b and sealed therein via use of silicon caulk, gaskets, O-rings, plugs, caps, or other conventional means, with wire leads 731, 733 or terminal extending from ends of openings 706a, 706b, or routed through openings 714a, 716a as desired for a particular application or installation. For application as an ozone generator, plugs or caps formed on extensions 712a, 712b (or on extensions 710a, 710b) may be drilled or cut so as to provide openings therein, and tubing may be conventionally attached to such extensions so as to transport air or another gas including diatomic oxygen through chamber 705 where irradiation of such diatomic oxygen by vacuum ultraviolet radiation leads to formation of ozone as described in Applicant's prior patents and patent applications. Thus ozonated gas may then be allowed to exit into additional tubing attached to similar opened extensions, preferably on an opposite end of enclosure 700, from which such ozonated gas may be routed to a Venturi or other fitting for use in water treatment.

In another application, where multipurpose enclosure 700 is to be used to support implementation of an advanced oxidation cell, ultraviolet lamp 730 or another source of ultraviolet radiation which includes at least wavelengths sufficiently short (generally shorter than approximately 400 nm) to disassociate ozone may be inserted into chamber 705 of an enclosure 700 and sealed therein as noted above. For example, for this application, lamp 730 may be an ultraviolet emitting mercury vapor discharge lamp having a conventional glass envelop instead of a quartz envelop so that at least the 254 nm radiation from a mercury vapor discharge is emitted with little attenuation. Openings formed in extensions 710a, 710b (or in extensions 712a, 712b) may be used to permit passage of water including ozone through chamber 705, where irradiation with ultraviolet radiation causes breakdown of ozone into diatomic and mono-atomic oxygen. Presence of mono-atomic oxygen and ultraviolet radiation creates an advanced oxidation environment high destructive to organic pathogens and other contaminants that may be present in water flowing through chamber 705. Conveniently, openings 706a, 706b may be designed to mate with an entrance or exit end of a Venturi injector fitting such as disclosed in Applicant's U.S. Pat. No. 6,192,911, so that enclosure 700 may be used to provide a modularized installation of a water purification system.

In another application, multipurpose enclosure 700 may be used as an erosion salt feeder by inserting a rod, cake, or block 740 of a salt mixture into chamber 705 instead of electrode plates. Any of extensions 708a, 708b, 710a, 710b, 712a, 712b may be used to attach tubing carrying water or another fluid so as to permit a flow of a fluid through chamber 705 to that salt from block 740 may be dissolved therein and thence transported for use in an electrolysis cell or other application as disclosed earlier herein.

Having thus described my invention and the manner of its use, it should be apparent to those skilled in the relevant arts that incidental changes may be made thereto that fairly fall within the scope of the following appended claims, wherein I claim:

The invention claimed is:

1. A system for treating water in a swimming pool, spa, or whirlpool bath, said system comprising:
   a main water circulation loop,
   a primary bypass loop connected to said main water circulation loop,
   a Venturi injector in said primary bypass loop,
   a source of ozone connected to said Venturi injector,
   a sensing mechanism for sensing at least a need for adding a halogen sanitizer to said water and providing an indication representative of said need to add said halogen sanitizer to said water,
   a halogen sanitizer flow for selectively providing said halogen sanitizer to said primary bypass loop, said halogen sanitizer flow further comprising:
      a first flow path including an electrolysis cell,
      a second flow path comprising a supply of halogen salt,
      a valve coupled to receive said flow of water, and connected to switch said flow of water between said first flow path and a flow path comprising said first flow path and said second flow path responsive to said indication of said need for adding said halogen sanitizer.

2. A system as set forth in claim 1 further comprising a flow restriction between an inlet and an outlet of said primary bypass loop.

3. A system as set forth in claim 2 wherein said flow restriction comprises at least a water filter.

4. A system as set forth in claim 2 wherein said flow restriction comprises at least one of an inlet and an outlet tube of said primary bypass loop, said at least one of said inlet and said outlet tube extending into said main water circulation loop.

5. A system as set forth in claim 4 wherein an inlet tube to said primary bypass loop extends into said main water circulation loop and an outlet tube from said primary bypass loop extends into said main water circulation loop, said inlet tube and said outlet tube connected to said main water circulation loop by a single saddle clamp.

6. A system as set forth in claim 4 wherein an opening of said inlet tube is oriented to face a flow of water through said main circulation loop, and an opening of said outlet tube is oriented to face away from said flow of water through said main circulation loop.

7. A system as set forth in claim 1 wherein said valve is a proportional valve, and said indication of a need for adding a halogen sanitizer is a sensed current flowing through said electrolysis cell.

8. A system as set forth in claim 1 further comprising a selectively energized power supply for said electrolysis cell wherein said selectively energized power supply is responsive to said need for adding said halogen sanitizer.

9. A system as set forth in claim 8 wherein said selectively energized power supply further comprises a variable power supply that causes said electrolysis cell to produce a variable amount of said halogen sanitizer responsive to said indication of need for adding a halogen sanitizer.

10. A system as set forth in claim 1 wherein said sensing mechanism is a halogen sanitizer sensor providing signals indicative of a sensed concentration of said halogen sanitizer, with said valve configured to switch said flow of water to said flow path comprising said first flow path and said second flow path responsive to a low sensed said concentration of said halogen sanitizer.

11. A system as set forth in claim 10 wherein said halogen sanitizer concentration sensor is mounted in said system to measure said halogen sanitizer concentration in said water flowing through said main water circulation loop prior to injection of said ozone in said main water circulation loop.

12. A system as set forth in claim 10 wherein said halogen sanitizer sensor comprises an attenuation chamber containing a sample of said water and a chlorine concentration indicator dye.

13. A system as set forth in claim 10 wherein said halogen sanitizer sensor is a redox sensor.

14. A system for treating water comprising:
   water circulation means for circulating water in a loop to and from a supply of said water,
   halogen sanitizer detector means for detecting a concentration of halogen sanitizer in said water, and providing signals indicative of a concentration of said halogen sanitizer, water flow means connected to said water circulation means for flowing a portion of said water circulating in said water circulation means in a loop from and to said water circulation means, a mixer connected to said water flow means, a supply of ozone connected to said mixer, halogen sanitizer flow supply means connected to said mixer and comprising:

a halogen salt electrolysis cell for selectively providing said halogen sanitizer responsive to a detected concentration of said halogen sanitizer in said water, a flow of water taken from said water flow means, water flow control means receiving said flow of water, for selectively providing said flow of water between a first flow path including said halogen salt electrolysis cell, and a second flow path including a supply of said halogen salt and said halogen salt electrolysis cell.

15. A system as set forth in claim 14 wherein said water flow control means selectively provides said flow of water to said first flow path responsive to a high detected concentration of said halogen sanitizer.

16. A system as set forth in claim 14 wherein said water flow control means selectively provides said flow of water to said second flow path responsive to a low detected concentration of said halogen sanitizer.

17. A system as set forth in claim 14 wherein said water flow control means further comprises a variable power supply for variably energizing said electrolysis cell and providing a variable amount of said halogen sanitizer.

\* \* \* \* \*